United States Patent
Zhao et al.

(10) Patent No.: US 12,484,011 B2
(45) Date of Patent: Nov. 25, 2025

(54) POSITIONING METHOD, TERMINAL DEVICE, AND NETWORK DEVICE

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/028,769

(22) Filed: Jan. 17, 2025

(65) Prior Publication Data

US 2025/0168814 A1    May 22, 2025

Related U.S. Application Data

(63) Continuation of application No. PCT/CN2023/096585, filed on May 26, 2023.

(30) Foreign Application Priority Data

Oct. 19, 2022   (CN) .......................... 202211282589.X

(51) Int. Cl.
*H04W 64/00* (2009.01)
*H04W 56/00* (2009.01)

(52) U.S. Cl.
CPC ....... *H04W 64/00* (2013.01); *H04W 56/0045* (2013.01)

(58) Field of Classification Search
CPC ..... H04W 28/26; H04W 48/08; H04W 48/14; H04W 72/04; H04W 72/044; H04W 74/004; H04W 74/006; H04W 74/04

USPC ..... 455/145, 6.1, 450, 550.1, 574, 522, 445, 455/419, 425

See application file for complete search history.

(56) References Cited

U.S. PATENT DOCUMENTS

| | | | |
|---|---|---|---|
| 11,337,171 B2* | 5/2022 | Kalhan | H04J 11/0069 |
| 2017/0150314 A1 | 5/2017 | Hwang et al. | |
| 2019/0021076 A1* | 1/2019 | Zhang | H04L 1/1812 |
| 2020/0367284 A1* | 11/2020 | Lei | H04W 74/0841 |
| 2021/0051672 A1* | 2/2021 | Rastegardoost | H04W 74/006 |
| 2021/0051707 A1* | 2/2021 | Rastegardoost | H04W 72/23 |
| 2022/0123891 A1* | 4/2022 | Ji | H04L 5/0051 |

(Continued)

FOREIGN PATENT DOCUMENTS

| | | |
|---|---|---|
| CN | 102307385 A | 1/2012 |
| CN | 102472809 A | 5/2012 |

(Continued)

OTHER PUBLICATIONS

CATT, "Discussion on the Enhancement of TA Acquisition for E-CID," 3GPP TSG RAN WG2 Meeting #79, R2-123588, Qingdao, P.R.China, Aug. 13-17, 2012, 3 pages.

(Continued)

*Primary Examiner* — Joseph Arevalo
(74) *Attorney, Agent, or Firm* — Fish & Richardson P.C.

(57) ABSTRACT

Provided in the present application are a positioning method, a terminal device, and a network device. One example method includes: transmitting, by a terminal device, a plurality of sequences to base stations of a plurality of cells; and receiving, by the terminal device, a plurality of TAs corresponding to the plurality of cells.

20 Claims, 5 Drawing Sheets

(56) References Cited

U.S. PATENT DOCUMENTS

| | | | |
|---|---|---|---|
| 2022/0210844 A1* | 6/2022 | MolavianJazi | H04W 74/006 |
| 2022/0368468 A1* | 11/2022 | Xiong | H04L 1/1819 |
| 2022/0408389 A1* | 12/2022 | Wang | H04W 56/0045 |
| 2023/0090914 A1* | 3/2023 | Cha | H04W 24/10 |
| | | | 370/329 |

FOREIGN PATENT DOCUMENTS

| | | |
|---|---|---|
| CN | 103314613 A | 9/2013 |
| CN | 115589634 A | 1/2023 |
| KR | 20210034319 A | 3/2021 |
| WO | WO 2022208896 A1 | 10/2022 |

OTHER PUBLICATIONS

International Search Report and Written Opinion in International Appln. No. PCT/CN2023/096585, mailed on Aug. 14, 2023, 11 pages (with partial English translation).

Office Action in Chinese Appln. No. 202211282589.X, mailed on May 31, 2025, 16 pages (with English translation).

\* cited by examiner

POSITIONING METHOD, TERMINAL DEVICE, AND NETWORK DEVICE

CROSS REFERENCE TO RELATED APPLICATIONS

The present application is a continuation of International Patent Application No. PCT/CN2023/096585, filed on May 26, 2023, which claims the benefit of priority to Chinese patent application No.202211282589X, entitled "POSITIONING METHOD, TERMINAL DEVICE, AND NETWORK DEVICE", filed with the China National Intellectual Property Administration on Oct. 19, 2022, the entire disclosures of which are incorporated herein by reference in their entirety.

TECHNICAL FIELD

The present disclosure relates to the technical field of communication, and more specifically, to a positioning method, a terminal device, and a network device.

BACKGROUND

Presently, there are multiple ways to position terminal devices. However, these positioning methods require terminal devices to support positioning operations, and the terminal devices can only achieve positioning after entering the corresponding process of positioning operations, which has high requirements for performance of terminal devices.

SUMMARY

Embodiments of the present disclosure provide a positioning method, a terminal device, and a network device. Various aspects involved in the embodiments of the present application are introduced in the following.

According to a first aspect of the present application, there is provided a positioning method. The method includes: obtaining, by a terminal device, multiple TAs corresponding to multiple cells, and positioning the terminal device with the multiple TAs.

According to a second aspect of the present application, there is provided another positioning method. The method includes: receiving, by a base station of a first cell, a positioning sequence transmitted by a terminal device; transmitting, by the base station of the first cell, a TA corresponding to the first cell to the terminal device based on the positioning sequence; where the first cell is one of multiple cells, and multiple TAs corresponding to the multiple cells are used for positioning the terminal device.

According to a third aspect of the present application, there is provided a terminal device. The terminal device includes: an obtaining unit configured to obtain multiple TAs corresponding to multiple cells, where the multiple TAs are used for positioning the terminal device.

According to a fourth aspect of the present application, there is provided a network device. The network device is configured as the base station of the first cell, and includes: a receiving unit, configured to receive a positioning sequence transmitted by the terminal device; and a sending unit, configured to transmit a TA corresponding to the first cell to the terminal device based on the positioning sequence; where the first cell is one of multiple cells, and multiple TAs corresponding to the multiple cells are used for positioning the terminal device.

According to a fifth aspect of the present application, there is provided a terminal device. The terminal device includes a processor and a memory, where the memory is configured to store one or more computer programs, and the processor is configured to call the computer programs in the memory to cause the terminal device to perform some or all of the steps of the method according to the first aspect.

According to a sixth aspect of the present application, there is provided a network device. The network device includes a transceiver, a processor, and a memory, where the memory is configured to store one or more computer programs, and the processor is configured to call the computer programs in the memory to cause the network device to perform some or all of the steps of the method according to the second aspect.

According to a seventh aspect of the present application, embodiments of the present application provide a communication system comprising the terminal device and/or the network device according to the previous aspects. In another possible design, the system may also include other devices that interact with the terminal device or the network device as provided in the embodiments of the present application.

According to an eighth aspect of the present application, the embodiments of the present application provide a computer-readable storage medium storing a computer program that causes a terminal to perform some or all of the steps of the method according to the first or second aspect.

According to a ninth aspect of the present application, the embodiments of the present application provide a computer program product, where the computer program product includes a non-transitory computer-readable storage medium storing a computer program, and the computer program is executable to cause a terminal to perform some or all of the steps of the method according to the first or second aspect. In some implementations, the computer program product may be a software installation package.

According to a tenth aspect of the present application, the embodiments of the present application provide a chip comprising a memory and a processor, where the processor is configured to call a computer program from the memory and execute the computer program to implement some or all of the steps of the method according to the first or second aspect.

According to the technical solutions provided in the embodiments of the present application, a terminal device can be positioned based on multiple TAs. A terminal device can obtain a TA through random access, which is a function that most terminal devices can support. Therefore, using multiple TAs to position the terminal device can lower the performance requirements for the terminal device and is also applicable to terminal devices that cannot support complex positioning algorithms.

DETAILED DESCRIPTION OF THE EMBODIMENTS

The technical solutions in the embodiments of the present disclosure will be described clearly and completely hereinafter in conjunction with the drawings in the embodiments of the present disclosure. Apparently, the described embodiments are only a part of the embodiments of the present disclosure, rather than all embodiments.

The technical solutions herein are described below in conjunction with the accompanying drawings.

Figure 1:
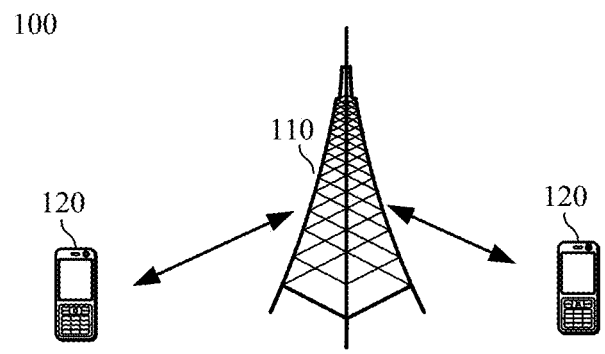
FIG. 1 shows a wireless communication system to which the embodiments of the present application are applied.

FIG. 1 shows a wireless communication system 100 to which the embodiments of the present application are applied. The wireless communication system 100 may include a network device 110 and a terminal device 120. The network device 110 may be a device that communicates with the terminal device 120. The network device 110 can provide communication coverage for specific geographic areas and can communicate with the terminal device 120 located within this coverage area.

FIG. 1 illustrates one network device and two terminal devices by way of example. Optionally, the wireless communication system 100 may include multiple network devices and each network device's coverage area may include other numbers of terminal devices, which is not limited by the embodiments of the present application.

Optionally, the wireless communication system 100 may also include other network entities, such as network controllers and mobility management entities, which is not limited by the embodiments of the present application.

It should be understood that the technical solution of the embodiments of the present application can be applied to various communication systems, such as: the fifth generation (5G) system or new radio (NR), long term evolution (LTE) system, LTE frequency division duplex (FDD) system, LTE time division duplex (TDD), etc. The technical solution provided in the present application can also be applied to future communication systems, such as the sixth generation mobile communication system, satellite communication system, and so on.

The terminal device in the embodiments of the present application may also be referred to as user equipment (UE), access terminal, user unit, user station, mobile platform, mobile station (MS), mobile terminal (MT), remote station, remote terminal, mobile device, user terminal, terminal, wireless communication device, user agent or user device. The terminal device in the embodiments of the present application may refer to a device that provides voice and/or data connectivity to users, and can be configured to communicate people, objects, and machines, such as handheld devices and vehicle mounted devices with wireless connection functions. The terminal device in the embodiments of the present application may be mobile phones, tablets, laptops, palmtop computers, mobile internet devices (MID), wearable devices, virtual reality (VR) devices, augmented reality (AR) devices, wireless terminals in industrial control, wireless terminals in self driving, wireless terminals in remote medical surgery, wireless terminals in smart grid, wireless terminals in transportation safety, wireless terminals in smart city, wireless terminals in smart home, etc. Optionally, UE can be configured to act as a base station.

It should also be understood that in the embodiments of the present application, the terminal may include, but is not limited to, terminal devices applied in the Internet of Things, for example, terminal devices connected to NB-IoT (which may be referred to as "NB-IoT terminals"): intelligent meter reading devices, logistics tracking devices, environment monitoring devices, etc.

The network device in the embodiments of the present application may be a device configured for communication with the terminal device. The network device may also be referred to as an access network device or a radio access network device. For example, the network device may be a base station. The network device in the embodiments of the present application may refer to a radio access network (RAN) node (or device) that connects a terminal device to a radio network. The base station may broadly cover or be replaced with the following various names, such as: NodeB, evolved NodeB (eNB), next generation NodeB (gNB), relay station, access point, transmitting and receiving point (TRP), transmitting point (TP), master eNB (MeNB), secondary eNB (SeNB), multi-standard radio (MSR) node, home base station, network controller, access node, wireless node, access point (AP), transmission node, transceiver node, base band unit (BBU), remote radio unit (RRU), active antenna unit (AAU), remote radio head (RRH), central unit (CU), distributed unit (DU), positioning node, etc. The base station may be a macro base station, a micro base station, a relay node, a donor node, or the like, or a combination thereof. The base station may also refer to a communication module, modem, or chip configured to be installed within the aforementioned equipment or devices. The base station may also be a device that performs base station functions in mobile switching centers, device-to-device (D2D) communication, vehicle-to-everything (V2X) communication, machine-to-machine (M2M) communication, a network side device in 6G network, and a device that performs base station functions in future communication systems. The base station can support networks of the same or different access technologies. The embodiments of the present application impose no limitation on the specific technology and device form adopted by the network device.

The base station may be fixed or mobile. For example, a helicopters or drone can be configured to act as a mobile base station, and one or more cells can move according to the location of the mobile base station. In other examples, a helicopter or drone can be configured as a device for communication with another base station.

In some deployments, the network device in the embodiments of the present application may refer to CU or DU, or the network device includes CU and DU. gNB may also include AAU.

The network device and the terminal device may be deployed on land, including indoor or outdoor, handheld or vehicle mounted; may also be deployed on the water surface; and may also be deployed on airplanes, balloons, and satellites in the air. The embodiments of the present embodiment impose no limitation on the scenarios in which the network device and the terminal device are located.

It should be understood that the communication devices referred to in the present application may be network devices or terminal devices. For example, the first communication device is a network device, and the second communication device is a terminal device. For another example, the first communication device is a terminal device, and the second communication device is a network device. For yet another example, both the first communication device and the second communication device are network devices, or both are terminal devices.

It should also be understood that all or part of the functions of the communication devices in the present application may also be implemented through software functions running on hardware, or through virtualization functions instantiated on platforms (such as cloud platforms). In wireless communication, spectrum shifting may be achieved through signal modulation. For example, the signal generated by the terminal is a low-frequency signal, which is not suitable for transmission in the channel. After signal modulation, the low-frequency signal may be converted into a high-frequency signal suitable for transmission in the channel.

For a terminal device in a radio resource control (RRC) idle state, it may establish an RRC connection with the base station through initial access. The initial access procedures may include cell search, uplink synchronization, etc.

Cell search may refer to a process in which the terminal device achieves downlink time-frequency synchronization with the base station and obtains a serving cell identity (ID). During the process of cell search, the terminal device may detect synchronization signal/physical broadcast channel (SSS/PBCH) (abbreviated as SSB). For uplink synchronization, the terminal device may achieve uplink synchronization with the base station through random access.

There are two ways of random access, one is contention-based random access, and the other is non-contention based random access. The two ways of random access are described below in conjunction with FIG. 2 and FIG. 3.

Figure 2:
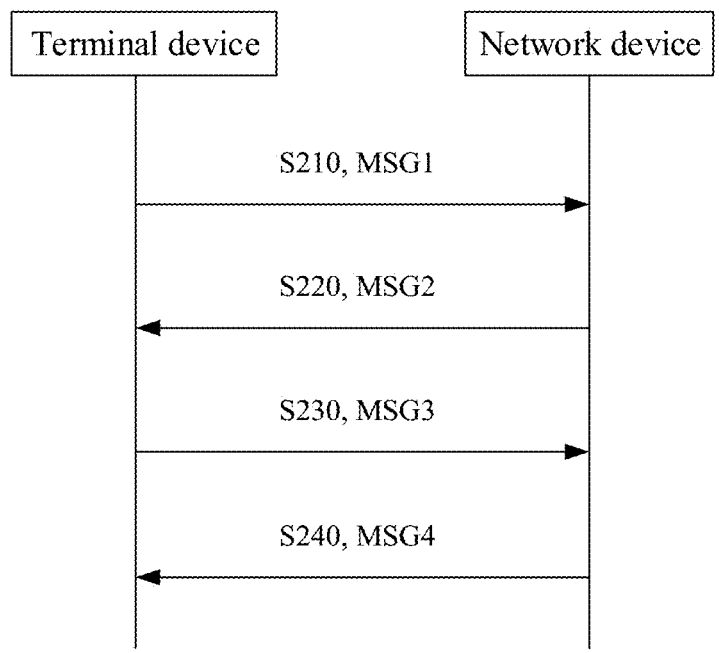
FIG. 2 is a schematic flow chart of a contention-based random access.

FIG. 2 is a flowchart of a contention-based random access method provided the embodiments of the present application. This method includes step S210 to step S240.

In step S210, the terminal device transmits message 1 (MSG1) during the random access process to the network device, MSG1 including a preamble.

The terminal device may select a random access channel (RACH) resource and a preamble, and transmit the selected preamble on the selected resource. This RACH resource may also be referred to as physical random access channel (PRACH) resource.

The network device may transmit configuration information of PRACH to the terminal device through broadcasting. The configuration information of PRACH may include the configuration information of its time-frequency resources and the configuration information of the initial preamble root sequence. The preamble or preamble set corresponding to the network device may be determined based on the configuration information of PRACH.

The network device may configure a shared preamble pool for the terminal device. The preambles in the preamble pool are shared by multiple terminal devices. The terminal device may select the preamble based on certain strategies. As the preambles are shared by multiple terminal devices, there may be a conflict where multiple terminal devices select the same preamble. To resolve this conflict, the network device may use the subsequent resolution mechanism to resolve it.

In step S220, the network device transmits MSG2 to the terminal device, where the MSG2 may also be referred to as random access response (RAR). This MSG2 may be carried through physical downlink control channel (PDCCH).

After the terminal device transmits MSG1, it may open an RAR time window and monitor the PDCCH scrambled by a random access-radio network temporary identifier (RA-RNTI) within this time window. RA-RNTI is related to the time-frequency resources of the RACH used by the terminal device for transmitting MSG1. After receiving the PDCCH, the terminal device may use the RA-RNTI to decode the PDCCH.

MSG2 may also include the preamble transmitted by the terminal device. If the terminal device receives the PDCCH scrambled by the RA-RNTI and the MSG2 includes the preamble transmitted by itself, it can be considered that the terminal device has successfully received the RAR.

After successfully receiving the PDCCH, the terminal device can obtain physical downlink shared channel (PDSCH) scheduled by the PDCCH, where PDSCH includes RAR. This RAR may include multiple pieces of information. For example, the subheader of RAR may include a backoff indicator (BI) which may be used to indicate the backoff time for retransmitting MSG1; the random access preamble identifier (RAP ID) in RAR indicates the preamble index received by the network device in response; the payload in RAR may include a timing advance group (TAG) which may be used to adjust the uplink timing; RAR may also include uplink grant (UL grant), i.e., uplink resource indication, for scheduling MSG3; and RAR may also include a Temporary cell-radio network temporary identifier (C-RNTI) which may be used by the terminal device in initial access to decode the PDCCH for MSG4.

If the terminal device does not receive RAR within the RAR time window or fails to verify successfully, it indicates a response failure. In this case, if the number of random access attempts by the terminal device is less than the upper limit (such as 10 times), the terminal device may still attempt random access. If the number of attempts exceeds the upper limit, it indicates that the random access has failed.

In step S230, the terminal device transmits MSG3 to the network device. The terminal devices may transmit MSG3 on the UL grant scheduled by the network device. This MSG3 may also be referred to as an RRC connection establishment request message.

This MSG3 is mainly used to inform the network device of what event triggers the random access process. MSG3 includes the C-RNTI of the terminal device. MSG3 transmitted by the terminal device may vary in different scenarios. Below are some examples of the scenarios.

For example, in an RRC connection establishment scenario, the terminal device may transmit an RRC connection establishment request message through MSG3, where the RRC connection establishment request message may carry a non-access stratum (NAS) UE-ID. The RRC connection establishment request message may be transmitted through the common control channel (CCCH) in the transmitting of the radio link control (RLC) layer. The message is not segmented.

For example, for an RRC connection reestablishment request, the terminal device may transmit the RRC reestablishment request message through MSG3. The RRC reestablishment request message does not carry NAS message. The RRC reestablishment request message may be transmitted via TM through CCCH of the RLC layer. The message is not segmented.

For another example, in the scenario of cell switching, if the terminal device accesses the target cell and has no dedicated preamble during the switching process, contention-based random access may be triggered. The terminal device may transmit RRC handover acknowledgment message and C-RNTI through MSG3. The RRC handover acknowledgment message and C-RNTI may be transmitted through a dedicated control channel (DCCH). In some embodiments, MSG3 may also carry a buffer status report (BSR).

In step S240, the network device transmits MSG4 to the terminal device.

This MSG4 has two functions, one is for resolving contention conflicts, and the other is for transmitting an RRC configuration message to the terminal device. If MSG3 from the terminal device carries C-RNTI, such as in the RRC reestablishment process, then MSG4 is scheduled by the PDCCH scrambled by this C-RNTI. Accordingly, the terminal device can use the C-RNTI in MSG3 to decode the PDCCH to obtain MSG4. If MSG3 from the terminal device does not carry C-RNTI, such as in the initial access process, then MSG4 may be scheduled by the PDCCH scrambled by a Temporary C-RNTI. Accordingly, the terminal device can use the Temporary C-RNTI in MSG2 to decode the PDCCH to obtain MSG4. After successfully decoding the PDCCH, the terminal device obtains the PDSCH carrying MSG4. The terminal device may compare the common control channel (CCCH) service data unit (SDU) in the PDSCH with the CCCH SDU in MSG3. If the two are the same, it indicates the contention has been successfully resolved. After the contention has been resolved, the Temporary C-RNTI is promoted to C-RNTI for a UE which detects RA success and does not already have a C-RNTI; it is dropped by others.

For random access scenarios such as switching and data transmission in uplink/downlink out-of-synchronization states, since the terminal device at this time has already been assigned a C-RNTI, the terminal device can inform the network device of the C-RNTI in the MAC CE of MSG3. Therefore, the base station can use the PDCCH scrambled by the C-RNTI instead of the Temporary C-RNTI to schedule MSG4 (The C-RNTI on PDCCH for UE in RRC_CONNECTED). The fact that the terminal device decodes the PDCCH scheduling instruction therefrom indicates the completion of contention resolving, and the specific content in MSG4 is no longer related to contention resolving. At this time, the TC-RNTI assigned by the base station in MSG2 becomes invalid, and is subsequently assigned by the base station to other UEs for use (A UE which detects RA success and already has a C-RNTI, resumes using its C-RNTI). Therefore, the MSG4 in this scenario does not include UE contention resolution identification.

Figure 3:
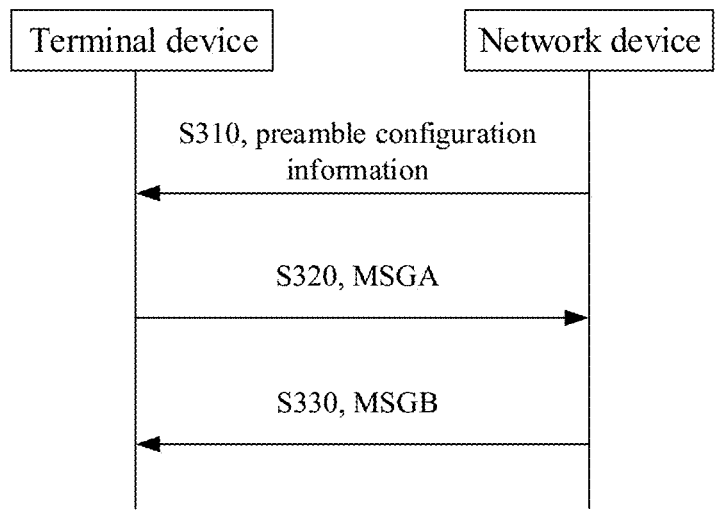
FIG. 3 is a schematic flow chart of a non-contention based random access.

FIG. 3 is a flowchart of a non-contention based random access method provided the embodiments of the present application. This method includes step S310 to step S330.

In step S310, the network device transmits preamble configuration information to the terminal device, where the preamble configuration information includes the required preamble and PRACH resources for the random access process. This preamble is a dedicated preamble assigned by the network device to the terminal device. The dedicated preamble may be informed to the terminal device through RRC signaling or physical (PHY) signaling (such as DCI in PDCCH). There will be no conflict with other terminal devices when using the dedicated preamble.

In step S320, the terminal device may transmit MSGA to the network device based on the preamble configuration information, which means that the terminal device may transmit the preamble to the network device on the RACH resource.

In step S330, the network device transmits MSGB to the terminal device, where the MSGB may include RAR. The fact that the terminal device receives the RAR indicates the end of the random access process.

In some application scenarios, it is required to position the terminal device. such as logistics monitoring, vehicle management, public safety, weather forecasting, auxiliary navigation, etc.

According to different positioning accuracies, positioning methods may include coarse positioning and precise positioning. The embodiments of the present application mainly introduce the coarse positioning method. Common coarse positioning methods may include cell-id based positioning which may also be referred to as CID positioning. The implementation principle of CID positioning may be as follows. A positioning platform transmits signaling to a core network to query the ID of the cell where the terminal device is located. Then, the positioning platform determines the approximate location of the terminal device based on the data stored in the base station almanac (BSA). The positioning accuracy of this positioning method depends on the size of the base station or cell, usually ranging from a few hundred to several thousand meters. Compared to precise positioning, coarse positioning has lower complexity.

Cell-id based positioning technology requires the terminal device be in RRC connected or RRC inactive state. Only terminal devices that are in RRC connected or RRC inactive state can obtain the relevant configuration information of positioning pilots, so that these terminal devices can be positioned.

In addition, the cell-id based positioning technology requires terminal devices support positioning operations. During the positioning process, the terminal device needs to enter the positioning operation process, and the positioning operation process requires the terminal device establish an RRC connection. The terminal device can receive positioning service requests and report according to its positioning capability. The terminal device can perform positioning measurements based on instructions from the positioning server and transmit the measurement results to the positioning server for position estimation. The positioning process is relatively complex and has high latency.

The cell-id based positioning technology has the problem of low positioning accuracy. In order to improve positioning accuracy, enhanced CID (E-CID) positioning technology has emerged. E-CID introduces some other information (such as angle-of-arrival (AOA), timing advance (TA), etc.) on the basis of cell-id for auxiliary positioning, thereby improving positioning accuracy.

However, E-CID positioning technology also requires terminal devices be in RRC connected state, and it performs positioning according to a similar process as CID positioning. These details increase the complexity and latency of positioning.

During the initial access process of the terminal device, the serving cell informs the terminal device of TA, so that uplink data packets of the terminal device can arrive at the base station at the desired time. The base station can correctly decode the uplink data as long as it receives the uplink data transmitted by the terminal device within the cyclic prefix (CP). Therefore, uplink synchronization requires all the arrival times of signals of different terminal devices from the same subframe at the base station fall within the CP. The base station transmits a TA to the terminal device to inform it of the size of the timing advance, so that all the arrival times of signals of different terminal devices from the same subframe but different frequency domains (such as different resource blocks (RB)) at the base station are substantially aligned, so that the uplink transmissions of different terminal devices from the same cell do not interfere with each other.

Based on the known cell id where the terminal device is located, the distance between the terminal device and the base station can be estimated according to TA, so that the location of the terminal device can be further determined, improving the positioning accuracy of terminal device.

However, in the positioning methods introduced earlier, terminal devices are required to support positioning operations, and the positioning process is relatively complex. Based on this, the embodiments of the present application provide a positioning method, in which terminal devices are positioned based on multiple TAs corresponding to multiple cells. The terminal devices are not required to support positioning operations. Terminal devices with relatively simple hardware such as modules can also be positioned. This method is also conducive to simplifying the positioning operation process.

In the existing system, the terminal device can only access one cell at a time. Therefore, the terminal device can only obtain TA information of one cell. As the terminal device cannot access multiple cells, it cannot obtain TA information of multiple cells. Therefore, there is currently no solution based on multiple TAs to position terminal devices in related technologies.

The technical solution provided in the embodiments of the present application is introduced with reference to FIG. 4 in the following.

Figure 4:
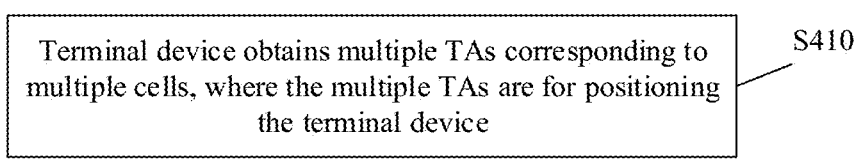
FIG. 4 is a schematic flowchart of a positioning method provided the embodiments of the present application.

Referring to FIG. 4, in step S410, the terminal device obtains multiple TAs corresponding to multiple cells, where the multiple TAs are for positioning the terminal device. There is a one-to-one correspondence between the multiple TAs and the multiple cells.

TA can be used to estimate the distance between the terminal device and the corresponding base station. Multiple TAs can be respectively used to estimate the distances between the terminal device and multiple base stations. The position information of the terminal device can be determined based on the distances between multiple terminal devices and multiple base stations, as well as the position information of each base station.

The embodiments of the present application impose no specific limitation on the number of the multiple cells. The number of the multiple cells may be greater than or equal to 2.

Taking multiple cells including three cells as an example, assuming that these three cells are Cell 1, Cell 2, and Cell 3 respectively, and the base stations corresponding to these three cells are Base Station 1, Base Station 2, and Base Station 3 respectively, the TAs corresponding to these three cells are TA1, TA2, and TA3 respectively, the Distance 1 between the terminal device and the Base Station 1 can be estimated based on TA1, the Distance 2 between the terminal device and the Base Station 2 can be estimated based on TA2, and the distance between the terminal device and the Base Station 3 can be estimated based on TA3. Furthermore, the position information of the terminal device can be determined based on Distance 1, Distance 2, Distance 3, as well as the position information of Base Station 1, Base Station 2, and Base Station 3.

In some embodiments, the TA may be obtained during the random access process, as random access is a function that most terminal devices can support. Therefore, using multiple TAs to position the terminal device can lower the performance requirements for the terminal device and is also applicable to terminal devices that cannot support complex positioning algorithms. For example, the positioning method of the embodiments of the present application can be applied to internet of things (IoT) devices, enhanced machine-type communication (eMTC) devices, reduced capability (Red-Cap) devices, and terminal devices with relatively simple hardware such as modules.

The embodiments of the present application impose no specific limitation on the way in which the terminal device obtains multiple TAs. For example, the terminal device may obtain multiple TAs by transmitting positioning sequences. In some embodiments, the terminal device may transmit positioning sequences to base stations in multiple cells. After receiving the positioning sequence, the base stations of multiple cells may transmit the TAs corresponding to the multiple cells to the terminal device, which means that the terminal device can receive the TAs corresponding to the multiple cells transmitted by the base stations of the multiple cells.

The above positioning sequences may be autonomously selected by the terminal device. The terminal device determines the sequence to be sent to the base station through autonomous selection without the need for configuration by the positioning server or serving cell, which can reduce the latency in obtaining the positioning sequence. In addition, the terminal device can obtain the positioning sequence during the initial access process and perform positioning operations without waiting for the terminal device to finish RRC connection, which can achieve the object of reducing latency.

In some embodiments, the positioning sequence may be a preamble. In some other embodiments, the positioning sequence may be an uplink pilot, such as a sounding reference signal (SRS). Regardless of the form of the positioning sequence, TA can be obtained using a method similar to random access.

In some embodiments, the terminal device may respectively transmit preambles corresponding to multiple cells to the base stations of multiple cells, so as to obtain the TAs corresponding to the multiple cells. In some embodiments, multiple cells may correspond to the same preamble, that is, the sets of preambles corresponding to the multiple cells intersect. In this case, the terminal device only needs to transmit the preamble once, that is, the terminal device may transmit the preamble corresponding to the multiple cells, and the base stations of these multiple cells can receive the preamble and transmit the corresponding TA to the terminal device. The terminal device does not need to obtain corresponding preambles for different cells or transmit the corresponding preambles to different cells, thereby reducing positioning latency. For example, assuming that a terminal device needs to transmit preambles for three cells, the terminal device needs to transmit three preambles to the three cells one by one. When the operating frequencies of base stations in different cells are different, the terminal device needs to perform frequency switching, which increases positioning latency. Therefore, the scheme of transmitting the preamble once in the embodiments of the present application can reduce positioning latency.

In some embodiments, multiple cells may include a first cell and a second cell. The first cell may refer to the cell accessed by the terminal device or the serving cell of the terminal device. The cell accessed by the terminal device may refer to the cell selected by the terminal device during the initial access process, but the terminal device has not yet established a connection with the base station of that cell. The first cell may also be a cell where the terminal device resides. The first cell may be the cell selected by the terminal device during the initial access process. In some embodiments, the second cell may be a neighbor cell of the first cell. The number of the second cell may be greater than or equal to 1.

Figure 5:
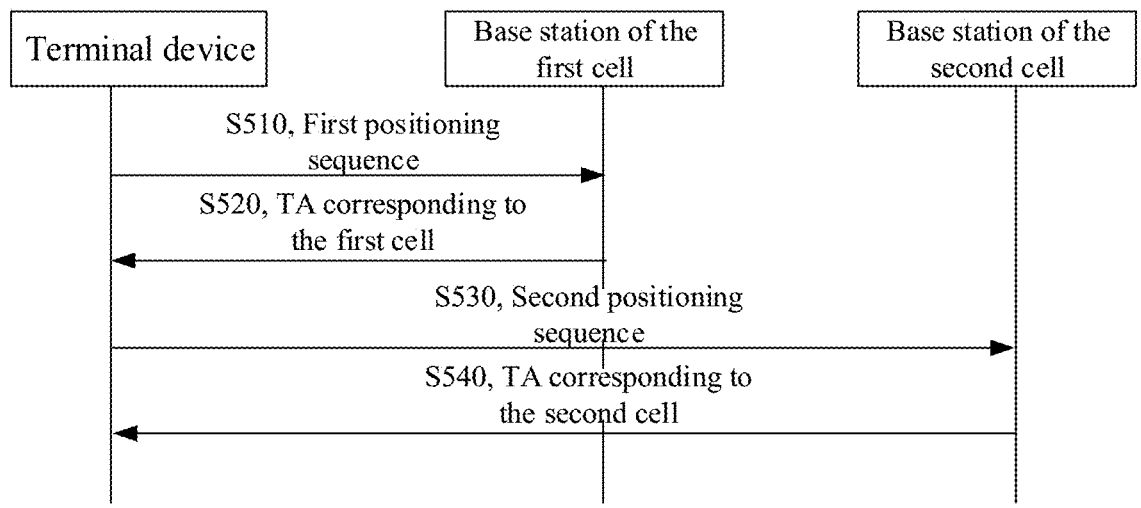
FIG. 5 is a schematic flowchart of another positioning method provided the embodiments of the present application.

FIG. 5 shows a schematic flowchart of the terminal device obtaining TAs corresponding to multiple cells.

As shown in FIG. 5, in step S510, the terminal device transmits a first positioning sequence to the base station of the first cell.

In step S520, after receiving the first positioning sequence transmitted by the terminal device, the base station of the first cell may transmit the TA corresponding to the first cell to the terminal device. In some embodiments, if the first positioning sequence is a preamble, the base station of the first cell may transmit a random access response (or MSG2) to the terminal device, where the random access response (or MSG2) includes the TA corresponding to the first cell.

In some embodiments, the terminal device may access the first cell through random access, and the terminal device may perform the complete random access process with the first cell. The random access method in which the terminal device accesses the first cell may be four-step random access or two-step random access.

In some embodiments, the terminal device may obtain the TA corresponding to the second cell after finishing random access with the first cell.

In step S530, the terminal device may transmit a second positioning sequence to the base station of the second cell.

In step S540, after receiving the second positioning sequence, the base station of the second cell may transmit the TA corresponding to the second cell to the terminal device.

The embodiments of the present application impose no specific limitation on the way the base station of the second cell transmits the TA corresponding to the second cell to the terminal device. For example, the base station of the second cell may directly transmit the TA corresponding to the second cell to the terminal device. If the second positioning sequence is a preamble, the base station of the second cell may transmit a random access response (or MSG2) to the terminal device, where the random access response (or MSG2) includes the TA corresponding to the second cell. The terminal device may obtain the TA corresponding to the second cell from the random access response.

For example, the base station of the second cell may transmit the TA corresponding to the second cell to the base station of the first cell, and the base station of the first cell may transmit the TA of the second cell to the terminal device. In this method, the TA of each neighboring cell is transmitted to the terminal device via the base station of the first cell, which can reduce the number of times of TA detection by the terminal device. The terminal device does not need to detect separately for different neighboring cells. In the case that the operating frequency of the second cell (neighboring cell) is different from that of the first cell (serving cell), if the TA is transmitted by the second cell, the user needs to interrupt the communication with the first cell to receive the TA transmitted by the second cell. Therefore, transmitting the TA of the second cell via the first cell can ensure communication and reduce latency. In some embodiments, after receiving the TA corresponding to the second cell, the base station of the first cell may also transmit the TA corresponding to the second cell separately to the terminal device, or transmit the TA corresponding to the second cell together with the TA corresponding to the first cell to the terminal device. In other words, the terminal device can receive TAs corresponding to multiple cells from the base station of the first cell. The TAs corresponding to multiple cells include the TA corresponding to the first cell and the TA corresponding to the second cell. The TA corresponding to the second cell is transmitted by the base station of the second cell to the base station of the first cell. For example, the base station of the second cell may transmit the TA corresponding to the second cell to the base station of the first cell through MSG2. The second cell may transmit the TA measured by the second cell and its corresponding PRACH format to the cells corresponding to these PRACH formats through signaling exchanged between base stations.

In some embodiments, the base station of the first cell may transmit a first MSG2 to the terminal device, the first MSG2 including the TA corresponding to the first cell; and the base station of the first cell may transmit a second MSG2 to the terminal device, the second MSG2 including the TA corresponding to the second cell.

The embodiments of the present application impose no specific limitation on the way the terminal device obtains the TA corresponding to the second cell. As an example, the terminal device may obtain the TA corresponding to the second cell within a measurement gap. As another example, the terminal device may obtain the TA corresponding to the second cell through cell switching (i.e. switching from the first cell to the second cell). As yet another example, the terminal device may transmit a common positioning sequence (hereinafter referred to as third positioning sequence) of the first and second cells, so as to obtain the TA corresponding to the first cell and the TA corresponding to the second cell through one transmission of the positioning sequence. These situations are separately introduced below.

If the operating frequency of the second cell is different from that of the first cell, the terminal device needs to interrupt communication with the first cell to communicate with the second cell. In some embodiments, the terminal device may finish the acquisition of the TA corresponding to the second cell within a first measurement gap.

The first measurement gap may be configured by the base station of the first cell for the terminal device. For example, the terminal device may transmit a measurement gap request to the base station of the first cell. After receiving the measurement gap request, the base station of the first cell may transmit the configuration information of the first measurement gap to the terminal device. After receiving the configuration information of the first measurement gap, the terminal device may obtain the TA corresponding to the second cell within the first measurement gap.

In some embodiments, the terminal device may transmit a first positioning sequence to the base station of the second cell within the first measurement gap, and the terminal device may also receive the TA corresponding to the second cell transmitted by the base station of the second cell within the first measurement gap.

In some embodiments, the first measurement gap may include multiple measurement gaps, each of which is used for obtaining the TA corresponding to one or more second cells.

In some embodiments, one measurement gap is used for obtaining the TA corresponding to one second cell. The terminal device may transmit a second positioning sequence to the base station of one second cell within one measurement gap. The terminal device may apply for one measurement gap for each second cell separately. This method can reduce the length of the measurement gap, which is beneficial for ensuring communication between the terminal device and the first cell.

In some embodiments, one measurement gap is used for obtaining the TA corresponding to multiple second cells. The terminal device may transmit a second positioning sequence to the base stations of multiple second cells within one measurement gap. The terminal device may finish the acquisition of the TAs corresponding to multiple second cells within one measurement gap. For example, the terminal device may apply for one measurement gap for all second cells, and finish the acquisition of the TAs for all second cells within this measurement gap. This method can accelerate the speed of the terminal device obtaining TA, thereby reducing positioning latency.

In some embodiments, the terminal device may obtain the TAs corresponding to multiple cells through cell switching. Taking multiple cells including the first cell and the second cell as an example, the terminal device may access the first cell through random access to obtain the TA corresponding to the first cell. In order to obtain the TA corresponding to the second cell, the terminal device may perform cell switching from the first cell to the second cell and perform random access with the second cell to obtain the TA corresponding to the second cell. When required to obtain TAs corresponding to multiple cells, the terminal device can follow the above method to obtain TAs corresponding to multiple cells through multiple times of cell switching.

The embodiments of the present application impose no specific limitation on the second positioning sequence. In some embodiments, the second positioning sequence mentioned above may be a common positioning sequence of multiple positioning sequence sets corresponding to multiple second cells. In other words, the second positioning sequence may belong to the intersection of multiple positioning sequence sets corresponding to multiple second cells. When selecting the second positioning sequence, the terminal device may select the positioning sequence supported by multiple second cells. In this way, by transmitting the second positioning sequence only once, multiple second cells can receive the second positioning sequence, and the terminal device can obtain the TAs corresponding to multiple second cells, which is beneficial for reducing positioning latency.

In some other embodiments, the second positioning sequence may be a positioning sequence in the positioning sequence set corresponding to the first cell, and the second positioning sequence may be transmitted by the base station of the first cell to the base station of the second cell. The base station of the first cell may transmit the second positioning sequence to the base station of the second cell. Apparently, the base station of the first cell may also transmit the positioning sequence set corresponding to the first cell to the base station of the second cell, so that the second cell can detect the positioning sequences in the positioning sequence set corresponding to the first cell.

In some embodiments, the positioning sequence set corresponding to the first cell and the positioning sequence set corresponding to the second cell may be the same or different, and the embodiments of the present application impose no specific limitation on this. For example, the positioning sequence set corresponding to the first cell and the positioning sequence set corresponding to the second cell may be identical. For another example, the positioning sequence set corresponding to the first cell and the positioning sequence set corresponding to the second cell may partially overlap. For yet another example, the positioning sequence set corresponding to the first cell is completely different from the positioning sequence set corresponding to the second cell.

According to this embodiment, the way in which the base station of the first cell transmits the second positioning sequence to the base station of the second cell allows that the positioning sequence set corresponding to the first cell and the positioning sequence set corresponding to the second cell can be independently rather than jointly configured, which is beneficial for reducing the difficulty of configuring the positioning sequence set. Configuring positioning sequence sets separately rather than jointly for different cells greatly reduces the complexity of designing and configuring positioning sequence.

In some embodiments, the first positioning sequence and the second positioning sequence may be the same or different. For example, the first positioning sequence and the second positioning sequence are different positioning sequences in the positioning sequence set corresponding to the first cell. For another example, the first positioning sequence is a positioning sequence in the positioning sequence set corresponding to the first cell, and the second positioning sequence is a positioning sequence in the positioning sequence set corresponding to the second cell. For yet another example, the first positioning sequence and the second positioning sequence are the same positioning sequence in the positioning sequence set corresponding to the first cell.

Since the terminal device communicates with the base station of the second cell only to obtain the TA corresponding to the second cell, the terminal device may not perform the complete random access with the second cell. For example, the terminal device may only perform the first two steps of random access with the second cell. In some embodiments, the second cell may transmit the TA corresponding to the second cell to the terminal device through MSG2. Since the terminal device does not need to perform subsequent transmission of MSG3 and MSG4, in this case, the MSG2 transmitted by the second cell to the terminal device may only include the TA and not the information related to MSG3 and MSG4, or information required for subsequent connection transmission. For example, MSG2 may not include resource configuration information of MSG3.

In some embodiments, if the terminal device transmits a preamble for positioning, the terminal device may not proceed with further steps after random access fails. For example, if random access fails, the terminal device may not need to reinitiate the random access process.

In the embodiments of the present application, transmitting different positioning sequences to the base stations of the first and second cells is beneficial for improving communication flexibility. For example, the terminal device transmits the first positioning sequence to the base station of the first cell, so that the terminal device can perform a complete random access process with the first cell, thereby obtaining synchronization with the first cell. The terminal device transmits the second positioning sequence to the base station of the second cell, so that the terminal device can perform an incomplete random access process with the second cell, thereby reducing positioning latency.

In some embodiments, after receiving the first positioning sequence, the base station of the first cell may transmit first indication information to the base station of the second cell, where the first indication information is used for indicating that the terminal device is about to transmit the second positioning sequence. In other words, the first positioning sequence can be used by the base station of the first cell to notify the base station of the second cell that the terminal device is about to transmit the second positioning sequence. After receiving the first indication information, the base station of the second cell may detect the second positioning sequence transmitted by the terminal device. This can reduce the complexity of detecting the second positioning sequence by the base station of the second cell, and avoid ineffective detection by the base station of the second cell. For example, the base station of the second cell may detect the second positioning sequence after receiving the first indication information. If the base station of the second cell does not receive the first indication information, the base station of the second cell does not need to detect the second positioning sequence.

In some embodiments, the terminal device may obtain the TAs corresponding to multiple cells by transmitting the positioning sequence to multiple cells only once. For example, the terminal device may transmit a third positioning sequence to base stations of multiple cells, where the third positioning sequence may be a common positioning sequence in the positioning sequence sets corresponding to the multiple cells. In other words, the third positioning sequence belongs to the intersection of the positioning sequence sets corresponding to the multiple cells. When selecting the third positioning sequence, the terminal device may select a positioning sequence supported by the multiple cells, so that all the base stations of these multiple cells can receive the third positioning sequence. After receiving the third positioning sequence, the base stations of the multiple cells may transmit the corresponding TAs to the terminal device.

Taking the third positioning sequence being a preamble as an example, since the third positioning sequence is a preamble supported by the multiple cells, the terminal device can obtain the TAs corresponding to the multiple cells during the initial access process (i.e. the terminal device is in an RRC idle state) without the need for performing RRC connection, which is beneficial for reducing positioning latency.

In some embodiments, the base stations of the multiple cells may transmit the corresponding TAs to the terminal device, respectively. In other words, the terminal devices can receive the TAs corresponding to the multiple cells respectively from the base stations of the multiple cells.

In some other embodiments, the base stations of the multiple cells may transmit the corresponding TAs to the base station of the first cell, and then the base station of the first cell may transmit the TAs corresponding to the multiple cells to the terminal device. For example, multiple cells include first cell and second cell. After receiving the third positioning sequence, the TA corresponding to the second cell may be transmitted to the base station of the first cell. After receiving the TA corresponding to the second cell, the base station of the first cell may transmit the TA corresponding to the first cell and the TA corresponding to the second cell to the terminal device. In this case, the terminal device can obtain TAs corresponding to multiple cells without interrupting communication with the first cell, which is beneficial for reducing the latency of obtaining TAs.

In some embodiments, the configuration information of the positioning sequence sets described above may be carried in the PRACH configuration information, which means that the positioning sequence sets can be indicated to the terminal device through the PRACH configuration information. In this way, the terminal device can obtain the positioning sequence sets as early as possible, rather than obtain the positioning sequence sets after random access, which is beneficial for reducing positioning latency. The above positioning sequence sets may include the positioning sequence set corresponding to the second cell.

In some embodiments, multiple positioning sequence sets corresponding to multiple second cells may be transmitted to the terminal device via the second cells. For example, each second cell can transmit its corresponding positioning sequence set to the terminal device. Taking the second cells including cell a and cell b as an example, the base station of cell a can transmit the positioning sequence set corresponding to cell a to the terminal device, and the base station of cell b can transmit the positioning sequence set corresponding to cell b to the terminal device. The base station of the second cell can transmit the positioning sequence set corresponding to the second cell to the terminal device through a physical broadcast channel (PBCH) and/or a system information block (SIB). Sending the positioning sequence set corresponding to the second cell through PBCH is beneficial for the terminal device to obtain the positioning sequence set as early as possible, thereby reducing positioning latency.

In some embodiments, multiple positioning sequence sets corresponding to multiple second cells may be transmitted to the terminal device via the first cell. The base station of the first cell may transmit the positioning sequence set corresponding to each second cell to the terminal device. The positioning sequence set corresponding to the second cell may be transmitted by the base station of the second cell to the base station of the first cell.

In some embodiments, the base station of the first cell may transmit the intersection of multiple positioning sequence sets corresponding to the multiple second cells to the terminal device. The base station of the first cell may determine the intersection of the multiple positioning sequence sets based on the multiple positioning sequence sets, and then transmit a positioning sequence in the intersection to the terminal device. As mentioned earlier, the second positioning sequence may belong to the intersection of multiple positioning sequence sets. The base station of the first cell transmits the intersection of multiple positioning sequence sets, which can reduce signaling overhead without affecting the positioning process.

In some embodiments, the base station of the first cell may also transmit the intersection of the positioning sequence set corresponding to the first cell and the positioning sequence set corresponding to the second cell to the terminal device. As mentioned earlier, the third positioning sequence may belong to the intersection of the positioning sequence sets corresponding to multiple cells. The base station of the first cell only transmitting the intersection of the positioning sequence set corresponding to the first cell and the positioning sequence set corresponding to the second cell can reduce signaling overhead without affecting the positioning process.

The terminal device may encounter sequence collision issues when selecting a positioning sequence from a positioning sequence set. For example, different terminal devices select the same positioning sequence, or there is an intersection between the positioning sequence sets corresponding to different cells. The probability of collision is related to the number of sequences in the positioning sequence set. When processing signals, the sequence signals transmitted by two sources can be identified through methods such as direction estimation and blind source separation. In some embodiments, when a sequence collision occurs, the base station of the second cell may transmit two or more TAs to the terminal device. For example, if two terminal devices select the same positioning sequence, the base station of the second cell can determine two TAs based on the positioning sequence, and the base station of the second cell can transmit these two TAs and their corresponding PRACH formats to the first cell or terminal devices.

Taking the positioning sequence being a preamble as an example, the solution of the embodiments of the present application is described in detail below.

The embodiments of the present application impose no specific limitation on the form of the positioning sequence. As an example, the positioning sequence may be a preamble dedicated to positioning. The preamble dedicated to positioning may include a preamble format dedicated to positioning and/or a preamble sequence dedicated to positioning. In some embodiments, the preamble dedicated to positioning may be configured for each cell, and there may or may not be intersection between the preambles dedicated to positioning corresponding to the cells.

The preamble dedicated to positioning may be transmitted by the base station to the terminal device. For example, the base station may transmit the preamble dedicated to positioning to the terminal device through SIB. The way in which a base station transmits a preamble dedicated to positioning can refer to the way in which a base station transmits a positioning sequence set in the previous section, and the parts not described in detail can refer to the description in the previous section. For example, the base station of the first cell may transmit a preamble dedicated to positioning for the first cell to the terminal device. The base station of the second cell may transmit a preamble dedicated to positioning for the second cell to the terminal device. In some embodiments, the base station of the first cell may transmit preambles dedicated to positioning for multiple cells to the terminal device. For example, the base station of the first cell may transmit preambles dedicated to positioning for both the first and second cells to the terminal device. For another example, the base station of the first cell may transmit the intersection of the preamble set corresponding to the second cell (such as multiple second cells) and the preamble set corresponding to the first cell to the terminal device.

If the base station receives a preamble dedicated to positioning transmitted by the terminal device, it can determine that the terminal device has a positioning requirement. In some embodiments, this preamble may be used to indicate a positioning service request which is used for requesting positioning for the terminal device, or in other words, for initiating a positioning service process.

After the base station of the first cell obtains the information that the terminal device needs positioning and the information of the second cell participating in positioning, the base station of the first cell may notify the second cell to prepare for positioning sequence detection, thereby reducing the complexity of sequence detection by the second cell.

As another example, this positioning sequence may reuse the preamble used for random access. For example, this preamble may be used for both positioning and random access. For example, there may be an intersection between the preamble set used for positioning and the preamble set used for random access.

If there is an intersection between the preamble set used for positioning and the preamble set used for random access, then the preamble used for positioning cannot indicate a positioning service request, or whether the preamble used for positioning can indicate a positioning service request is indicated by the base station. For example, the base station may indicate to the terminal device through SIB the information that whether the preamble can be used for indicating a positioning service request. For another example, the base station can indicate to the terminal device the information that which preambles can be used for indicating a positioning service request and which preambles cannot be used for indicating a positioning service request.

In some embodiments, the terminal device may transmit the cell ID of the second cell expected to be used for positioning to the base station of the first cell. For example, the terminal device may transmit the information of the second cell (such as cell ID) to the base station of the serving cell through MSG3 and/or physical uplink shared channel (PUSCH). After receiving the information of the base station of the second cell, the base station of the serving cell can transmit the preamble set (or PRACH configuration information) corresponding to the base station of the second cell to the terminal device.

In some embodiments, the terminal device may determine the second cell expected to be used for positioning through downlink measurements. For example, the terminal device may determine the second cell expected to be used for positioning based on the signal measurement results of different second cells. The following will provide a detailed description of the method for determining the second cell.

In some embodiments, the terminal device may select a preamble from the intersection of preambles dedicated to positioning corresponding to multiple cells when selecting a preamble. For example, if the set of preambles dedicated to positioning for Cell 1 is Set a, the set of preambles dedicated to positioning for Cell 2 is Set b, and the set of preambles dedicated to positioning for Cell 3 is Set c, and the intersection of Set a, Set b, and Set c includes Preamble 1, then the terminal device can transmit Preamble 1 to the base station when positioning is required.

As described above, the terminal device can transmit the preamble in the intersection of the preamble sets corresponding to the multiple cells to the base station. Therefore, when configuring the preamble sets corresponding to the multiple cells, it is necessary to perform special configuration on the preamble sets corresponding to the multiple cells, so that the preamble sets corresponding to the multiple cells can include a same preamble. In some communication systems, such as NR systems, PRACH is required to carry SSB index information. SSB index limits the flexibility of PRACH and increases the difficulty of designing preambles for positioning.

For a terminal device, when selecting a preamble, the terminal device is required to select from the preamble set corresponding to the detected SSB index. For one cell, different SSB indexes may correspond to different preamble sets. In addition, SSB indexes are generally associated with wave beam directions, and different SSB indexes correspond to different wave beam directions, which means that different SSB indexes correspond to different coverage areas. The coverage area corresponding to the SSB index can be understood as the coverage area of the wave beam corresponding to the SSB index. In the embodiments of the present application, the SSB indexes corresponding to coverage areas having an intersection also correspond to preamble sets having an intersection, which can reasonably configure the preamble sets and reduce the difficulty of configuring the preamble sets. For example, if the coverage area corresponding to SSB Index a of Cell 1 and the coverage area corresponding to SSB Index b of Cell 2 have an intersection, then the preamble set corresponding to SSB Index a and the preamble set corresponding to SSB Index b also have an intersection. For example, the preamble set corresponding to SSB Index a and the preamble set corresponding to SSB Index b may be configured as the same set.

In some embodiments, the configuration of the preamble sets may be coordinated by the positioning server. In some embodiments, each cell may transmit SSB index information to the positioning server, and the positioning server may configure the preamble set corresponding to the SSB index based on the SSB index information.

In some embodiments, the configuration of the preamble sets may also be coordinated by the base station of the cell. Base stations of multiple cells may transmit the SSB index information of their own cells to the base station of one cell, and the base station of that cell may configure the preamble sets corresponding to the SSB indexes based on the SSB index information of each cell.

The SSB index information may include one or more pieces of the following information: the wave beam direction corresponding to the SSB index and the wave beam width corresponding to the SSB index. The wave beam direction may be either absolute or relative. For example, the wave beam direction may be a relative direction of the wave beam to a datum direction (or reference direction).

In some communication systems (such as NR systems), when the sequence length of the preamble format is 139, the communication system defines 9 independent preamble formats, including A1, A2, A3, B1, B2, B3, B4, C0, and C2. When jointly designing preambles among cells, that is, when the preamble sets corresponding to multiple cells have an intersection, the preambles in the intersection need to use the same format, which further limits the flexibility of preamble selection.

In the embodiments of the present application, a corresponding preamble set may be configured for the base station of the first cell, and the preambles in this preamble set can be used for positioning. The base station of the first cell may transmit some or all of the preambles in this preamble set to the base station of the second cell. The second cell may detect the received preambles. In this way, there is no need to conduct joint configuration for the preamble set corresponding to the second cell and the preamble set corresponding to the first cell, which is beneficial for reducing the difficulty of preamble configuration.

In some communication systems (such as NR systems), the preamble set needs to be determined based on the SSB index. The base station of the first cell may transmit the SSB index information to the base station of the second cell, so that the second cell may determine the preambles to be detected based on the SSB index information.

The SSB index information may include one or more pieces of the following information: the wave beam direction corresponding to the SSB index and the wave beam width corresponding to the SSB index. The wave beam direction may be either absolute or relative. For example, the wave beam direction may be a relative direction of the wave beam to a datum direction (or reference direction).

After receiving the SSB index information, the base station of the second cell may determine the wave beam directions it can receive based on the wave beam direction and/or wave beam width corresponding to the SSB index. The second cell may perform preamble detection in the wave beam directions it can receive.

In some embodiments, when transmitting a preamble dedicated to positioning to the base station of the second cell, the base station of the first cell may transmit information such as the preamble sequence and the time-frequency resources of the preamble to the base station of the second cell. The second cell may detect the preamble based on the time-frequency resources of the preamble.

In some embodiments, when transmitting a preamble dedicated to positioning to the base station of the second cell, the base station of the first cell may transmit the wave beam information (such as wave beam direction) corresponding to the preamble to the base station of the second cell. The base station of the second cell may determine the preambles it can receive (such as preamble directions it can receive) based on the wave beam information corresponding to the preambles, as well as the position information of the base stations of the second cell and the first cell, and detect these preambles.

The embodiments of the present application impose no specific limitation on the way the base station of the second cell transmits TA to the terminal device. For example, the base station of the second cell may transmit MSG2 to the terminal device, the MSG2 carrying the TA corresponding to the second cell. For another example, the base station of the second cell may transmit MSG2 to the base station of the first cell, the MSG2 carrying the TA corresponding to the second cell. After receiving the TA corresponding to the second cell, the base station of the first cell may transmit the TA corresponding to the second cell to the terminal device. For yet another example, in some embodiments, the second cell cannot obtain the UE ID of the terminal device, the base station of the second cell may transmit an identifier of the preamble (such as RAP ID) and the TA corresponding to the second cell to the base station of the first cell, and the base station of the first cell may determine the terminal device corresponding to the TA based on the identifier of the preamble.

In some embodiments, the terminal device may obtain TAs corresponding to multiple cells through MSG1 and MSG2 polling. For example, the terminal device may transmit MSG1 to Cell 1 and receive MSG2 transmitted by Cell 1, the MSG2 including the TA corresponding to Cell 1. Then, the terminal device may transmit MSG1 to Cell 2 and receive MSG2 transmitted by Cell 2, the MSG2 including the TA corresponding to Cell 2. The above process is repeated until the terminal device obtains the TAs corresponding to all the cells.

In some embodiments, the terminal device may measure RSRP of multiple cells and determine the cells involved in positioning based on the RSRP measurement results. The terminal device may transmit the cell IDs involved in positioning to the base station of the first cell, so that the base station of the first cell may transmit the PRACH configuration information corresponding to these cells to the terminal device.

In some embodiments, the PRACH configuration information corresponding to the second cell may be transmitted by the base station of the second cell to the terminal device. The base station of the second cell may transmit the PRACH configuration information corresponding to the second cell to the terminal device through PBCH or SIB. Since PBCH is received by the terminal device earlier than SIB, the advantage of transmitting PRACH configuration information through PBCH is that it allows the terminal device to obtain PRACH configuration at a lower latency, which is beneficial for reducing positioning latency. When the operating frequency of the second cell is different from that of the first cell, the terminal device needs to suspend communication with the first cell and switch to the frequency band of the second cell for measurement or communication. Therefore, minimizing the latency in obtaining PRACH configuration information can reduce the duration of communication interruption with the first cell.

In some embodiments, after the terminal device transmits MSG1 to the second cell through polling, the second cell may transmit MSG2 to the base station of the first cell to transmit the TA corresponding to itself to the base station of the first cell, and the base station of the first cell may forward the TA corresponding to the second cell to the terminal device.

In some embodiments, the terminal device may apply for a measurement gap from the base station of the first cell to perform MSG1 and MSG2 polling within the measurement gap.

In some embodiments, the terminal device may determine the preamble to be transmitted to the base station of the second cell based on the PRACH configuration information corresponding to the second cell. The PRACH configuration information corresponding to the second cell may include the preamble set corresponding to the second cell. The terminal device may select the preamble that needs to be transmitted to the second cell from the preamble set.

In some embodiments, the PRACH configuration information of the second cell may be obtained through detection by the terminal device. For example, the terminal device may obtain the PRACH configuration information of the second cell by detecting a system message of the second cell.

In some other embodiments, the PRACH configuration information of the second cell may be transmitted by the base station of the first cell to the terminal device. Transmitting the PRACH configuration information of the second cell through the base station of the first cell can save the procedures of the terminal device detecting the PRACH configuration information, which is beneficial for reducing the latency in obtaining TA and thus reducing the positioning latency.

Since the terminal device aims to obtain the TA corresponding to the second cell, the terminal device does not need to perform a complete random access process with the second cell, as long as it can obtain the TA corresponding to the second cell. For example, taking the contention-based random access process as an example, the terminal device can perform only the first two steps of random access with the second cell and not perform the last two steps, thereby saving signaling overhead and reducing positioning latency.

The second cell in the embodiments of the present application may be any cell other than the first cell, or the second cell may be determined in accordance with certain rules. For example, the cell ID of the second cell may be determined based on first information. The first information may include one or more pieces of the following information: the signal measurement result and position information of the second cell.

In some embodiments, the cell ID of the second cell may be determined based on the signal measurement result of the cell. In some other embodiments, the cell ID of the second cell may be determined based on the position information of the cell. In some other embodiments, the cell ID of the second cell may be determined based on the signal measurement result and the position information of the cell.

The signal measurement results of the cell affect the path loss between the terminal device and the cell. The greater the path loss, the worse the signal quality between the terminal device and the cell. The signal quality further affects the measurement of TA corresponding to the cell. Determining the second cell based on the signal measurement result of the cell is beneficial for ensuring the acquisition of TA. The embodiments of the present application may select a cell with a good signal measurement result as the second cell. For example, a cell with a signal measurement result greater than or equal to a third threshold may be selected as the second cell. The signal measurement result may include one or more of the following: reference signal receiving power (RSRP), reference signal receiving quality (RSRQ), and signal to interference plus noise ratio (SINR).

Figure 6:
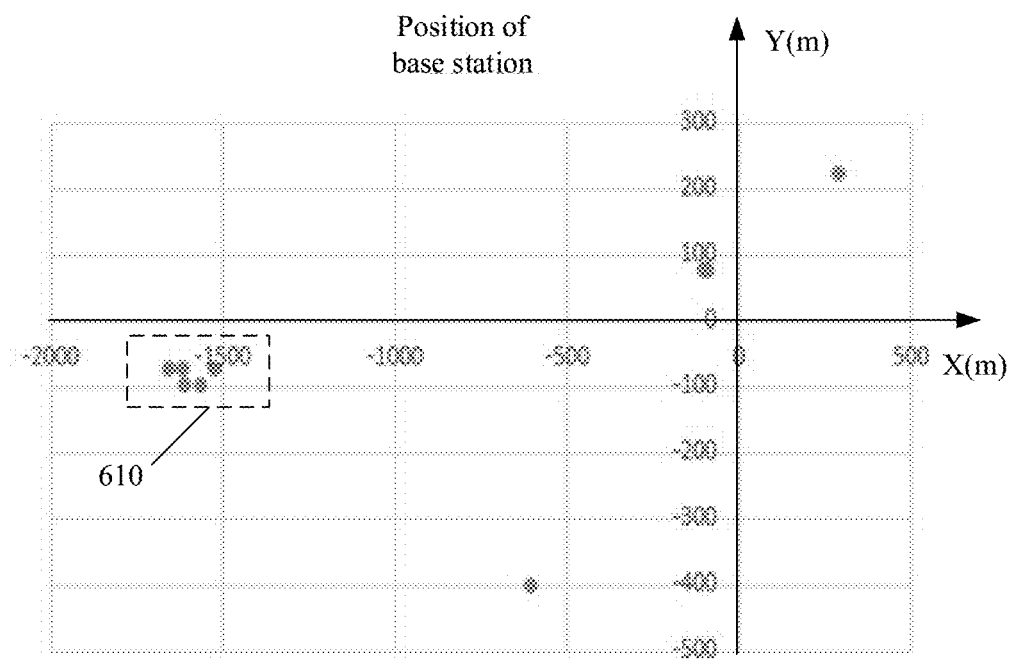
FIG. 6 is a schematic diagram of positions of some base stations.

The position information of a cell may include a distance between the base stations of two cells. FIG. 6 shows a schematic diagram of the positions of some base stations. The dots in FIG. 6 represent base stations. The horizontal and vertical legends in FIG. 6 respectively represent the x and y coordinates of the base stations measured in meters.

In some embodiments, the distance between two base stations may be relatively short, such as the five base stations in dashed box 610 in FIG. 6. The distance between every two of these five base stations is very small. If the distance between two base stations is small, this may adversely affect the positioning accuracy of the terminal device. In order to ensure positioning accuracy, the embodiments of the present application take the distance between the base stations of two cells into consideration when selecting the second cell.

Figure 7:
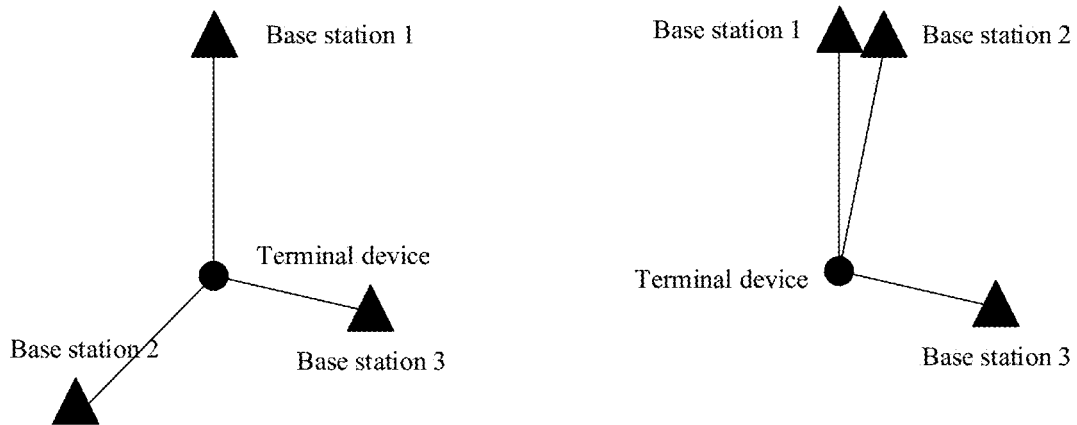
FIG. 7 is a schematic diagram of positioning a terminal device based on locations of base stations.

Taking FIG. 7 as an example, FIG. 7 shows three base stations, namely Base Station 1, Base Station 2, and Base Station 3. Different positioning algorithms have different adaptability. The three base stations in the left part of FIG. 7 are far apart from each other, and the terminal device may be positioned by means of triangulate location. Regarding the three base stations in the right part of FIG. 7, Base Station 1 and Base Station 2 are relatively close to each other. If triangulate location is used, the positioning effect may not be ideal. Therefore, when multiple base stations are co-located or adjacent, selecting an effective base station is necessary to determine an effective positioning algorithm and achieve a desirable positioning result.

The position information of the second cell may include one or more pieces of the following information: the distance between the base station of the second cell and the base station of the first cell, as well as the distance between the base stations of different second cells. In other words, the second cell may be selected based on the distance between the base station of the second cell and the base station of the first cell, and/or the distance between the base stations of different second cells. This method of selecting the second cell can avoid selecting two cells that are very close, which is beneficial for improving the positioning accuracy of the terminal device.

In some embodiments, the second cell satisfies one or more of the following conditions: the distance between the base station of the second cell and the base station of the first cell is greater than or equal to the first threshold; the distance between the base stations of different second cells is greater than or equal to the second threshold.

Assuming there are multiple candidate cells, multiple candidate cells are used to determine the second cell, or in other words, multiple candidate cells include the second cell. When selecting the second cell from multiple candidate cells, the distance between the base station of the candidate cell and the base station of the first cell may be considered, as well as the distance between the base stations of different candidate cells.

In some embodiments, the second cell satisfies the following conditions: the distance between the base station of the second cell and the base station of the first cell is greater than or equal to the first threshold; the distance between the base stations of different second cells is greater than or equal to the second threshold. In this embodiment, a certain distance is required to exist between the base station of the second cell and the base station of the first cell, and a certain distance is also required to exist between the base stations of different second cells. This ensures that a certain distance exists between every two of the multiple cells used for positioning, which is beneficial for improving positioning accuracy.

In some embodiments, the second cell satisfies the following formula:

$$d_{BS,ij} < d_{threshold}$$

where $d_{BS,ij}$=weuclidean $(BS_i, BS_j)$, $BS_i$ represents a position of the base station of the first cell i or a position of a base station whose signal measurement result meets a preset condition, $BS_j$ represents a position of the base station of the second cell j, and $d_{threshold}$ represents a threshold value. The fact that the signal measurement result meets the preset conditions may refer to that RSRP is greater than or equal to the preset threshold. The base station whose signal measurement result meets the preset conditions is also referred to as a reference base station hereinafter.

As can be seen from the above formula, the distance between the base station of the second cell and the base station of the first cell should be less than or equal to the threshold $d_{threshold}$, or the distance between the base station of the second cell and the reference base station should be less than or equal to the threshold. This can ensure that the selected second cell is not too close to the base station of the first cell or to the reference base station, which is conducive to improving positioning accuracy.

The method of determining the second cell described above may be used alone or in combination, which is not limited by the embodiments of the present application. For example, the second cell meets one or more of the following conditions: the distance between the base station of the second cell and the base station of the first cell is greater than or equal to the first threshold; the distance between the base stations of different second cells is greater than or equal to the second threshold; and the signal measurement result of the second cell is greater than or equal to the third threshold.

In some embodiments, the second cell satisfies the following conditions: the distance between the base station of the second cell and the base station of the first cell is greater than or equal to the first threshold; the distance between the base stations of different second cells is greater than or equal to the second threshold; and the signal measurement result of the second cell is greater than or equal to the third threshold. In this embodiment, in addition to requiring a certain distance between cells, it is also required to ensure the communication quality between the terminal device and the second cell.

The cell ID of the second cell may be determined by the base station of the first cell or by the positioning server, which is not limited by the embodiments of the present application. If the cell ID of the second cell is determined by the base station of the first cell, the base station of the first cell may transmit the cell ID of the second cell to the terminal device, so that the terminal device can obtain the TA corresponding to the second cell based on the cell ID of the second cell. If the cell ID of the second cell is determined by the positioning server, the positioning server may transmit the cell ID of the second cell to the terminal device, so that the terminal device can obtain the TA corresponding to the second cell based on the cell ID of the second cell. After receiving the cell ID of the second cell, the terminal device may transmit a preamble to the second cell to obtain the TA corresponding to the second cell. The cell ID of the second cell may include ID information of the second cell.

In some embodiments, the terminal device may transmit the cell IDs of the candidate cells and the signal measurement results of the candidate cells to the base station of the first cell, so that the base station of the first cell can determine the second cell. In other embodiments, the terminal device may transmit the cell IDs of the candidate cells and the signal measurement results of the candidate cells to the positioning server, so that the positioning server can determine the second cell. The candidate cells may be cells detected by the terminal device. The base station of the first cell and/or the positioning server can use their known position information of each base station, in combination with the cell IDs and signal measurement results reported by the terminal device, to determine the second cell for which the terminal device needs to perform TA measurement.

In some embodiments, the terminal device may measure the candidate cells and obtain the signal measurement results of the candidate cells during the initial access process. The candidate cells may include the first cell and the second cell.

In some embodiments, the base station of the first cell and/or the positioning server may calculate the distance between two base stations (such as Euclidean distance) to determine the second cell. The calculation formula for Euclidean distance may be as follows:

$$d_{BS,ij} = \text{weuclidean}(BS_i, BS_j)$$

where weuclidean represents Euclidean distance, $BS_i$ represents Base Station i, $BS_j$ represents Base Station j, $d_{BS,ij}$ represents the Euclidean distance between Base Station i and Base Station j.

For the convenience of description, determining the second cell by the base station of the first cell is taken as an example to introduce the scheme of the embodiments of present application below. The method of determining the second cell by the base station of the first cell is similar to the method of determining the second cell by the positioning server. For the sake of conciseness, the latter will not be repeated here.

Figure 8:
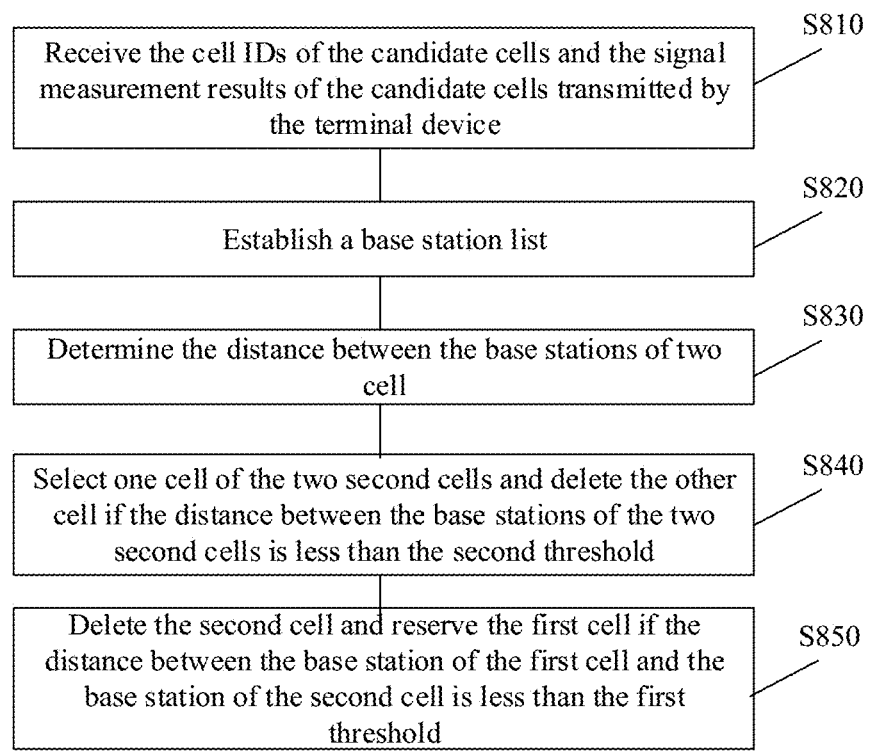
FIG. 8 is a schematic flowchart of one method for determining a second cell provided the embodiments of the present application.

As shown in FIG. 8, in step S810, the terminal device transmits the cell IDs of the candidate cells and the signal measurement results of the candidate cells to the base station of the first cell. That is to say, the base station of the first cell receives the cell IDs of the candidate cells and the signal measurement results of the candidate cells transmitted by the terminal device. The candidate cells are cells detected by the terminal device. The candidate cells include the first cell and the second cell.

In step S820, after receiving the cell IDs of the candidate cells reported by the terminal device, the base station of the first cell may establish a base station list based on the cell IDs of the candidate cells. The base station of the first cell can use the known position information of the base stations to determine the distance between two base stations.

In step S830, the base station of the first cell determines the distance between the base stations of two cells. The base station of the first cell can compare the base stations in the base station list pairwise. If the distance between two base stations is less than the threshold, the base station of the first cell may select one base station of the two base stations.

In step S840, if the compared objects are two second cells and the distance between the base stations of the two second cells is less than the second threshold, the base station of the first cell may select one cell of the two second cells and deletes the other cell. The base station of the first cell may select the second cell from the two second cells based on the signal measurement results. For example, the base station of the first cell may reserve the cell with a better signal measurement result in the two cells, or the base station of the first cell may reserve the cell with a signal measurement result greater than or equal to the third threshold. If the signal measurement results of the two second cells are both less than the third threshold, the base station of the first cell may delete the two second cells.

In step S850, if the compared objects are the first cell and the second cell, and the distance between the base station of the first cell and the base station of the second cell is less than the first threshold, the base station of the first cell may delete the second cell and reserve the first cell. That is to say, if the distance between a second cell and the first cell is too short, then this second cell is deleted and not used for positioning.

In some embodiments, the base station of the first cell may mark the deleted second cell, and the marked second cell may no longer participate in subsequent comparisons, which can reduce the complexity of selecting the second cell and improve the rationality of the selected second cell.

For example, if the second cell a is compared with the first cell and the distance between the base station of the second cell a and the base station of the first cell is less than the first threshold, the second cell a may be deleted. The base station of the first cell may mark the second cell a, so that there is no need to further compare the second cell a with other cells (such as the second cell b), which can reduce the number of comparisons and reduce positioning latency.

In the process of selecting the second cell, the base station of the first cell may calculate the distance between the base station of each candidate cell and the base station of the first cell, and exclude the cell whose distance from the base station of the first cell is less than the first threshold. Then, the base station of the first cell compares the remaining base stations pairwise, and one base station is selected from the two nearby base stations if the distance between two base stations is less than the second threshold. After the above comparison and exclusion process, the remaining cells may be qualified as the second cells.

The embodiments of the present application impose no specific limitation on the execution order of determining the second cell by the base station of the first cell. For example, the server of the first cell may first determine the signal measurement results of candidate cells and exclude the cell whose signal measurement result is less than the third threshold. Then, the server of the first cell may determine whether the distance between the base station of the candidate cell and the base station of the first cell is less than the first threshold, thereby excluding the cell whose distance from the base station of the first cell is less than the first threshold. Furthermore, the server of the first cell may compare the remaining candidate cells pairwise, and one base station is selected from two base stations if the distance between the base stations of two candidate cells is less than the second threshold. Through the above process, the base station of the first cell may select out the second cell.

For another example, the server of the first cell may first determine whether the distance between the base station of the candidate cell and the base station of the first cell is less than the first threshold, thereby excluding the cell whose distance from the base station of the first cell is less than the first threshold. Then, the server of the first cell may compare the remaining candidate cells pairwise. If the distance between the base stations of two candidate cells is less than the second threshold, the base station with a signal measurement result greater than or equal to the third threshold is selected from these two base stations based on the corresponding signal measurement results of the two candidate cells.

In some embodiments, after obtaining the TAs corresponding to multiple cells, the terminal device may transmit the TAs and base station IDs of the multiple cells to the positioning server, so that the positioning server can position the terminal device based on the TAs and base station IDs of the multiple cells. The positioning server may position the terminal device according to a positioning service request. The positioning server may transmit the positioning result to the terminal device.

The terminal device in the embodiments of the present application may access the first cell via contention-based random access, or via non-contention based random access. In addition, the terminal device may access the second cell via contention-based random access, or via non-contention based random access.

The positioning method of the embodiments of the present application may be used alone or combined with other positioning methods. For example, the embodiments of the present application may combine multiple TAs with cell IDs to jointly position the terminal device. For another example, the positioning method of the embodiments of the present application may be combined with other precise positioning methods to precisely position the terminal device.

The embodiments of method of the present application are described in detail above with reference to FIG. 1 to FIG. 8. The embodiments of device of the present application are described in detail below with reference to FIG. 9 to FIG. 11. It should be understood that the description of the embodiments of method corresponds to the description of the embodiments of device. Therefore, the parts not described in detail can refer to the previous embodiments of method.

Figure 9:
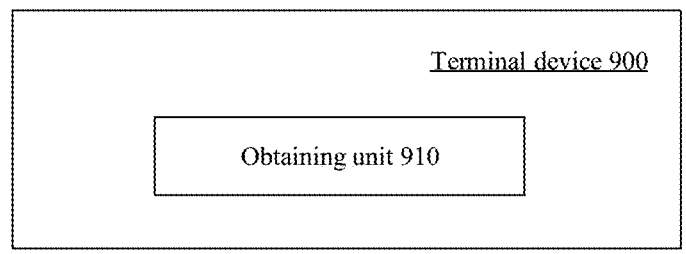
FIG. 9 is a schematic block diagram of a terminal device provided in the embodiments of the present application.

FIG. 9 is a schematic block diagram of a terminal device provided in the embodiments of the present application. A terminal device 900 shown in FIG. 9 may be any of the terminal devices described above. The terminal device 900 may include an obtaining unit 910.

The obtaining unit 910 is configured to obtain multiple TAs corresponding to multiple cells, where the multiple TAs are used for positioning the terminal device.

Optionally, in some embodiments, the obtaining unit 910 is configured to: transmit preambles to base stations of multiple cells; and receive TAs corresponding to the multiple cells transmitted by the base stations of the multiple cells.

Optionally, in some embodiments, the multiple cells include the first cell and the second cell, where the first cell is the cell accessed by the terminal device or the serving cell of the terminal device; and the obtaining unit 910 is configured to: transmit a first positioning sequence to the base station of the first cell, where the first positioning sequence is used by the base station of the first cell to notify the base station of the second cell that the terminal device is about to transmit a second positioning sequence; receive the TA corresponding to the first cell transmitted by the base station of the first cell; transmit the second positioning sequence to the second cell; and receive the TA corresponding to the second cell transmitted by the base station of the second cell.

Optionally, in some embodiments, the obtaining unit 910 is configured to: transmit the second positioning sequence to the base station of the second cell within a first measurement gap.

Optionally, in some embodiments, the obtaining unit 910 is configured to: receive the TA corresponding to the second cell transmitted by the base station of the second cell within the first measurement gap.

Optionally, in some embodiments, the first measurement gap includes multiple measurement gaps, each of which is used for obtaining the TA corresponding to one or more second cells.

Optionally, in some embodiments, the multiple cells include the first cell and the second cell, where the first cell is the cell accessed by the terminal device or a serving cell of the terminal device, and the obtaining unit 910 is configured to: receive TAs corresponding to multiple cells from the base station of the first cell, where the TAs corresponding to multiple cells include the TA corresponding to the first cell and the TA corresponding to the second cell, and the TA corresponding to the second cell is transmitted by the base station of the second cell to the base station of the first cell.

Optionally, in some embodiments, the obtaining unit 910 is configured to: receive a first MSG2 from the base station of the first cell, where the first MSG2 includes the TA corresponding to the first cell; and receive a second MSG2 from the base station of the first cell, where the second MSG2 includes the TA corresponding to the second cell.

Optionally, in some embodiments, the number of second cell is plural; the second positioning sequence is a common positioning sequence in multiple sets of positioning sequences corresponding to multiple second cells, or the second positioning sequence is a sequence in a set of positioning sequences corresponding to the first cell; where the second positioning sequence is transmitted by the base station of the first cell to the base station of the second cell.

Optionally, in some embodiments, the multiple sets of positioning sequences are transmitted by the base station of the first cell to the terminal device, or the intersection of the multiple sets of positioning sequences is transmitted by the base station of the first cell to the terminal device.

Optionally, in some embodiments, the set of positioning sequences corresponding to the second cell is transmitted by the base station of the second cell to the terminal device through PBCH and/or SIB.

Optionally, in some embodiments, the obtaining unit 910 is configured to: transmit a third positioning sequence to the base stations of the multiple cells, where the third positioning sequence is a common positioning sequence in the sets of positioning sequences corresponding to the multiple cells.

Optionally, in some embodiments, the positioning sequence is a preamble.

Optionally, in some embodiments, the positioning sequence is a preamble dedicated to positioning.

Optionally, in some embodiments, the multiple cells include the first cell and the second cell, where the first cell is a cell accessed by the terminal device or a serving cell of the terminal device, and information of the preamble dedicated to positioning is transmitted by the base station of the first cell to the base station of the second cell to enable the base station of the second cell to detect the preamble dedicated to positioning.

Optionally, in some embodiments, the positioning sequence is used for indicating a positioning service request, which is used to request positioning for the terminal device.

Optionally, in some embodiments, the positioning sequence used for indicating the positioning service request is a preamble dedicated to positioning, or the positioning sequence used for indicating the positioning service request is indicated to the terminal device by the base station of the first cell, where the first cell is the cell accessed by the terminal device or a serving cell of the terminal device.

Optionally, in some embodiments, the positioning sequence is determined from preamble sets corresponding to the SSB indexes transmitted by the multiple cells, and the SSB indexes corresponding to coverage areas having an intersection correspond to preamble sets having an intersection.

Optionally, in some embodiments, the configuration information of the positioning sequence is carried in PRACH configuration information.

Optionally, in some embodiments, the cell ID of the second cell is determined based on first information. The first information includes one or more pieces of the following information: the signal measurement result and position information of the second cell.

Optionally, in some embodiments, the position information of the second cell includes one or more pieces of the following information: the distance between the base station of the second cell and the base station of the first cell, as well as the distance between the base stations of different second cells.

Optionally, in some embodiments, the second cell satisfies the following formula:

$$d_{BS,ij} < d_{threshold}$$

where $d_{BS,ij}$=weuclidean ($BS_i$, $BS_j$), $BS_i$ represents a position of the base station of the first cell i or a position of a base station whose signal measurement result meets a preset condition, $BS_j$ represents a position of the base station of the second cell j, and $d_{threshold}$ represents a threshold value.

Optionally, in some embodiments, the second cell satisfies one or more of the following conditions: the distance between the base station of the second cell and the base station of the first cell is greater than or equal to a first threshold; a distance between the base stations of different second cells is greater than or equal to a second threshold; and the signal measurement result of the second cell is greater than or equal to a third threshold.

Optionally, in some embodiments, the second cell is determined by the base station of the first cell or the positioning server.

Optionally, in some embodiments, the cell ID of the second cell is transmitted by the terminal device to the base station of the first cell through MSG3 and/or PUSCH.

Figure 10:
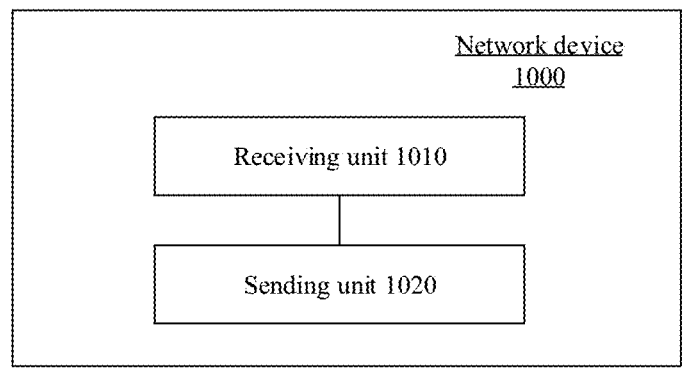
FIG. 10 is a schematic block diagram of a network device provided in the embodiments of the present application.

FIG. 10 is a schematic block diagram of a network device provided in the embodiments of the present application. A network device 1000 shown in FIG. 10 may be a base station of the first cell, where the base station may be any of the base stations of the first cell described above. The network device 1000 may include a receiving unit 1010 and a sending unit 1020.

The receiving unit 1010 is configured to receive a positioning sequence transmitted by the terminal device.

The sending unit 1020 is configured to transmit a TA corresponding to the first cell to the terminal device based on the positioning sequence.

The first cell is one of multiple cells, and multiple TAs corresponding to the multiple cells are used for positioning the terminal device.

Optionally, in some embodiments, the multiple cells include the first cell and the second cell, where the first cell is the cell accessed by the terminal device or a serving cell of the terminal device, and the receiving unit 1010 is configured to: receive a first positioning sequence transmitted by the terminal device, where the first positioning sequence is used by the base station of the first cell to notify the base station of the second cell that the terminal device is about to transmit a second positioning sequence; the sending unit 1020 is configured to: transmit, in response to the first positioning sequence, the TA corresponding to the first cell to the terminal device; and the sending unit 1020 is further configured to: transmit first indication information to the base station of the second cell based on the first positioning sequence, where the first indication information is used for indicating that the terminal device is about to transmit the second positioning sequence.

Optionally, in some embodiments, the receiving unit 1010 is further configured to: receive a measurement gap request transmitted by the terminal device; and the sending unit 1020 is further configured to: transmitting configuration information of a first measurement gap to the terminal device, where the first measurement gap is used for obtaining the TA corresponding to the second cell.

Optionally, in some embodiments, the first measurement gap includes multiple measurement gaps, each of which is used for obtaining the TA corresponding to one or more second cells.

Optionally, in some embodiments, the multiple cells include the first cell and the second cell, where the first cell is the cell accessed by the terminal device or a serving cell of the terminal device, and the receiving unit 1010 is further configured to: receive the TA corresponding to the second cell transmitted by the base station of the second cell; the sending unit 1020 is configured to: transmit TAs corresponding to the multiple cells to the terminal device, where the TAs corresponding to the multiple cells include the TA corresponding to the first cell and the TA corresponding to the second cell.

Optionally, in some embodiments, the number of second cell is plural; the second positioning sequence is a common positioning sequence in multiple sets of positioning sequences corresponding to multiple second cells, or the second positioning sequence is a sequence in a set of positioning sequences corresponding to the first cell; where the second positioning sequence is transmitted by the base station of the first cell to the base station of the second cell.

Optionally, in some embodiments, the multiple sets of positioning sequences are transmitted by the base station of the first cell to the terminal device, or the intersection of the multiple sets of positioning sequences is transmitted by the base station of the first cell to the terminal device.

Optionally, in some embodiments, the set of positioning sequences corresponding to the second cell is transmitted by the base station of the second cell to the terminal device through PBCH and/or SIB.

Optionally, in some embodiments, the receiving unit 1010 is configured to: receive a third positioning sequence transmitted by the terminal device, where the third positioning sequence is a common positioning sequence in the sets of positioning sequences corresponding to the multiple cells.

Optionally, in some embodiments, the positioning sequence is a preamble.

Optionally, in some embodiments, the positioning sequence is a preamble dedicated to positioning.

Optionally, in some embodiments, the multiple cells include the first cell and the second cell, where the first cell is a cell accessed by the terminal device or a serving cell of the terminal device, and the positioning sequence is transmitted by the base station of the first cell to the base station of the second cell to enable the base station of the second cell to detect the positioning sequence.

Optionally, in some embodiments, the positioning sequence is used for indicating a positioning service request, which is used to request positioning for the terminal device.

Optionally, in some embodiments, the positioning sequence used for indicating the positioning service request is a preamble dedicated to positioning, or the positioning sequence used for indicating the positioning service request is indicated to the terminal device by the base station of the first cell, where the first cell is the cell accessed by the terminal device or a serving cell of the terminal device.

Optionally, in some embodiments, the positioning sequence is determined from preamble sets corresponding to the SSB indexes transmitted by the multiple cells, and the SSB indexes corresponding to coverage areas having an intersection correspond to preamble sets having an intersection.

Optionally, in some embodiments, the sending unit 1020 is further configured to: transmit SSB index information to the base station of the second cell, where the SSB index information includes one or more pieces of the following information: a wave beam direction corresponding to the SSB index, wherein the wave beam direction is absolute or relative; and a wave beam width corresponding to the SSB index; wherein the SSB index information is used for configuring, by the second cell, the preamble set corresponding to the second cell, or the SSB index information is used for determining, by the second cell, the preamble to be detected.

Optionally, in some embodiments, the configuration information of the positioning sequence is carried in PRACH configuration information.

Optionally, in some embodiments, the cell ID of the second cell is determined based on first information. The first information includes one or more pieces of the following information: the signal measurement result and position information of the second cell.

Optionally, in some embodiments, the position information of the second cell includes one or more pieces of the following information: the distance between the base station of the second cell and the base station of the first cell, as well as the distance between the base stations of different second cells.

Optionally, in some embodiments, the second cell satisfies one or more of the following conditions: the distance between the base station of the second cell and the base station of the first cell is greater than or equal to a first threshold; a distance between the base stations of different second cells is greater than or equal to a second threshold; and the signal measurement result of the second cell is greater than or equal to a third threshold.

Optionally, in some embodiments, the cell ID of the second cell is determined by the base station of the first cell or the positioning server.

Optionally, in some embodiments, the cell ID of the second cell is transmitted by the terminal device to the base station of the first cell through MSG3 and/or PUSCH.

Figure 11:
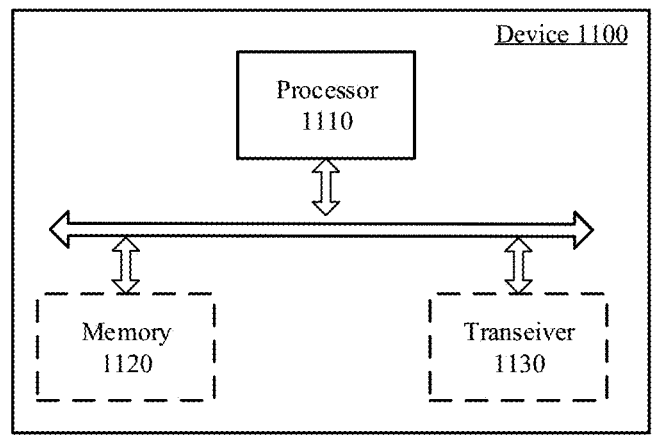
FIG. 11 is a schematic block diagram of a communication device provided in the embodiments of the present application.

FIG. 11 is a schematic diagram of the structure of a communication device in the embodiments of the present application. The dashed line in FIG. 11 indicates that the unit or module is optional. The device 1100 can be configured to implement the method described in the above method embodiments. The device 1100 may be a chip, terminal device, or network device. For example, the device 1100 may be the base station of the first cell.

The device 1100 may include one or more processors 1110. The processor 1110 can support the device 1100 to implement the method described in the previous method embodiments. The processor 1110 may be a general-purpose processor or a dedicated processor. For example, the processor may be a central processing unit (CPU). Alternatively, the processor may also be other general-purpose processor, digital signal processor (DSP), application specific integrated circuits (ASIC), field programmable gate array (FPGA) or other programmable logic device, discrete gate or transistor logic device, discrete hardware component, etc. The general-purpose processor may be a microprocessor or any conventional processor.

The device 1100 may also include one or more memories 1120. The memory 1120 stores a program that can be executed by the processor 1110, enabling the processor 1110 to perform the method described in the previous method embodiments. The memory 1120 may be independent of the processor 1110 or integrated into the processor 1110.

The device 1100 may also include a transceiver 1130. The processor 1110 may communicate with other devices or chips through the transceiver 1130. For example, the processor 1110 can exchange data with other devices or chips through the transceiver 1130.

The embodiments of the present application also provide a computer-readable storage medium for storing a program. The computer-readable storage medium can be applied to the terminal or network device provided in the embodiments of the present application, and the program stored therein enables the computer to execute the method executable by the terminal or network device in the embodiments of the present application.

The embodiments of the present application also provide a computer program product. The computer program product includes a program. The computer program product can be applied to the terminal or network device provided in the embodiments of the present application, and the program included therein enables the computer to execute the method executable by the terminal or network device in the embodiments of the present application.

The embodiments of the present application also provide a computer program. The computer program can be applied to the terminal or network device provided in the embodiments of the present application, and enables the computer to execute the method executable by the terminal or network device in the embodiments of the present application.

It should be understood that the terms "system" and "network" in the present application can be used interchangeably. In addition, the terms used in the present application are only for explaining the specific embodiments of the present application, and are not intended to limit the present application. The terms "first," "second," "third," and "fourth" used in the specification, claims, and accompanying drawings of the present application are intended to distinguish different objects and not to describe a specific order. In addition, the terms "include" and "have", as well as any variations thereof, are intended to cover nonexclusive inclusions.

In the embodiments of the present application, the term "indication" may be a direct indication, an indirect indication, or a representation of an associated relationship. For example, A indicates B, which may mean that A directly indicates B. For example, B can be obtained through A; which may also mean that A indirectly indicates B, for example, A indicates C, and B can be obtained through C; which may also mean that there is a correlation between A and B.

In the embodiments of the present application, "B corresponding to A" indicates that B is associated with A, and B can be determined according to A. But it should also be understood that determining B according to A does not mean determining B solely according to A, but mean that B can be determined according to A and/or other information.

In the embodiments of the present application, the term "corresponding" may indicate a direct or indirect correspondence relationship between two objects, an association relationship between the two objects, or a relationship of indicating and being indicated, configuring and being configured.

In the embodiments of the present application, "being pre-defined" or "being pre-configured" can be implemented by pre-storing corresponding codes or tables in devices (for example, including terminal devices and network devices) or other ways that can be used for indicating relevant information. The specific implementation method therefor is not limited in the present application. For example, being pre-defined may refer to being defined in a protocol.

In the embodiments of the present application, the term "protocol" may refer to standard protocols in the field of communication, such as LTE protocol, NR protocol, and related protocols applied in future communication systems, which is not limited in the present application.

The term "and/or" in the embodiments of the present application only describes the association relationship between related objects, indicating that there may exist three types of relationships. For example, A and/or B may cover the following three situations: A exists alone, A and B exist simultaneously, and B exists alone. In addition, the character "/" in this paper generally indicates that the related objects before and after the "/" are in an "or" relationship.

In the embodiments of the present application, the sequence numbers of the above processes do not imply the order of execution and should not constitute any limitation on the implementation process of the embodiments of the present application. The order of execution of each process should be determined by its function and internal logic.

In the several embodiments provided in the present application, it should be understood that the disclosed systems, devices, and methods can be implemented in other ways. For example, the device embodiments described above are only illustrative. For example, the division of units is only a division in accordance with logical function. In practical implementation, there may be other division methods. For example, multiple units or components may be combined or integrated into another system, or some features may be ignored or not executed. On the other hand, the mutual coupling or direct coupling or communication connection shown or discussed may be indirect coupling or communication connection through some interfaces, devices or units, which can be electrical, mechanical or in other forms.

The units described as separate components may or may not be physically separated, and the components shown as units may or may not be physical units, i.e., these components may be located in one place or distributed across multiple network units. Some or all of the units can be selected according to actual needs to achieve the purpose of the embodiments.

In addition, the functional units in various embodiments of the present application may be integrated into one processing unit, may physically exist separately, or, two or more of the functional units may be integrated into one unit.

In the above embodiments, the functional units can be fully or partially implemented through software, hardware, firmware, or any combination thereof. When implemented using software, the units can be fully or partially implemented in the form of a computer program product. The computer program product includes one or more computer instructions. When loading and executing the computer program instructions in a computer, all or part of the processes or functions described in the embodiments of the present application are generated. The computer may be a general-purpose computer, a dedicated computer, a computer network, or other programmable device. The computer instructions may be stored in a computer-readable storage medium or transmitted from one computer-readable storage medium to another. For example, the computer instructions may be transmitted from a website, computer, server, or data center to another website, computer, server, or data center via wired (such as coaxial cable, fiber optic, digital subscriber line (DSL)) or wireless (such as infrared, wireless, microwave, etc.) means. The computer-readable storage medium can be any available medium that a computer can read, or a data storage device such as a server or data center that integrates one or more available media. The available medium may be magnetic medium (such as floppy disk, hard disk, magnetic tape), optical medium (such as digital video disc (DVD)), or semiconductor medium (such as solid state disk (SSD)).

The above only describes specific implementation of the present application, but the scope of protection of the present application is not limited thereto. Any skilled person familiar with the technical field can easily conceive changes or replacements within the technical scope disclosed by the present application. These changes or replacements should be covered in the scope of protection of the present application. Therefore, the scope of protection of the present application shall be subject to the scope of protection of the appended claims.

What is claimed is:

1. A method, comprising:
transmitting, by a terminal device, one or more sequences to base stations of a plurality of cells, wherein the one or more sequences are determined from preamble sets corresponding to synchronization signal/physical broadcast channel (SSB) indexes; and
in response to the one or more sequences, receiving, by the terminal device, a plurality of timing advances (TAs) corresponding to the plurality of cells, wherein receiving, by the terminal device, the plurality of TAs corresponding to the plurality of cells comprises:
receiving, by the terminal device, at least one message 2 (MSG2) from a base station of a first cell, wherein the at least one MSG2 comprises a first TA corresponding to the first cell and a second TA corresponding to a second cell.

2. The method of claim 1, further comprising:
positioning the terminal device based on the plurality of TAs.

3. The method according to claim 1, wherein transmitting, by the terminal device, one or more sequences to base stations of a plurality of cells comprises:
transmitting, by the terminal device, a first sequence to the base station of the first cell, wherein the first sequence indicates that the terminal device is about to transmit a second sequence; and
transmitting, by the terminal device, a second sequence to a base station of the second cell.

4. The method according to claim 3, wherein transmitting, by the terminal device, the second sequence to a base station of the second cell comprises:
transmitting, by the terminal device, the second sequence to the base station of the second cell within a measurement gap corresponding to second cell.

5. The method according to claim 1, wherein
the second TA corresponding to the second cell is received within a measurement gap corresponding to the second cell.

6. The method according to claim 1, wherein receiving, by the terminal device, the plurality of TAs corresponding to the plurality of cells comprises:
receiving, by the terminal device, a first MSG2 from a base station of a first cell, wherein the first MSG2 comprises the first TA corresponding to the first cell; and
receiving, by the terminal device, a second MSG2 from the base station of the first cell, wherein the second MSG2 comprises the second TA corresponding to the second cell.

7. The method according to claim 1, wherein the one or more sequences are received from a base station of a serving cell, wherein the plurality of cells comprises the serving cell.

8. The method according to claim 7, wherein the one or more sequences are received through a physical broadcast channel (PBCH) or a system information block (SIB).

9. The method according to claim 1, wherein transmitting, by the terminal device, the one or more sequences to base stations of a plurality of cells comprises:
transmitting, by the terminal device, a common sequence to base stations of more than one cells, wherein the plurality of cells comprises the more than one cells.

10. The method according to claim 1, wherein each of the one or more sequences is a preamble.

11. The method according to claim 1, wherein each of the one or more sequences indicates a positioning service request.

12. The method according to claim 1, wherein the SSB indexes corresponding to coverage areas having an intersection correspond to preamble sets having an intersection.

13. The method according to claim 1, wherein configuration information of the one or more sequences is carried in physical random access channel (PRACH) configuration information.

14. The method according to claim 1, wherein a cell identity (ID) of the second cell is transmitted by the terminal device to the base station of the first cell through at least one of message 3 (MSG3) or physical uplink shared channel (PUSCH), wherein the plurality of cells comprises the first cell and the second cell.

15. An apparatus, comprising:
at least one processor;
one or more non-transitory computer-readable storage media coupled to the at least one processor and storing programming instructions for execution by the at least one processor, wherein the programming instructions, when executed, cause the apparatus to perform operations comprising:
transmitting one or more sequences to base stations of a plurality of cells, wherein the one or more sequences are determined from preamble sets corresponding to synchronization signal/physical broadcast channel (SSB) indexes; and
in response to the one or more sequences, receiving, a plurality of timing advances (TAs) corresponding to the plurality of cells, wherein receiving the plurality of TAs corresponding to the plurality of cells comprises:
receiving at least one message 2 (MSG2) from a base station of a first cell, wherein the at least one MSG2 comprises a first TA corresponding to the first cell and a second TA corresponding to a second cell.

16. The apparatus of claim 15, the operations further comprising:
  positioning the apparatus based on the plurality of TAs.

17. The apparatus of claim 15, wherein transmitting one or more sequences to base stations of a plurality of cells comprises:
  transmitting a first sequence to the base station of the first cell, wherein the first sequence indicates that the apparatus is about to transmit a second sequence; and
  transmitting a second sequence to a base station of the second cell.

18. The apparatus of claim 17, wherein transmitting the second sequence to a base station of the second cell comprises:
  transmitting the second sequence to the base station of the second cell within a measurement gap corresponding to second cell.

19. The apparatus of claim 15, wherein the second TA corresponding to the second cell is received within a measurement gap corresponding to the second cell.

20. One or more non-transitory computer-readable media storing computer instructions, that when executed by one or more processors, cause a computing device to perform operations comprising:
  transmitting one or more sequences to base stations of a plurality of cells, wherein the one or more sequences are determined from preamble sets corresponding to synchronization signal/physical broadcast channel (SSB) indexes; and
  in response to the one or more sequences, receiving, a plurality of timing advances (TAs) corresponding to the plurality of cells, wherein receiving the plurality of TAs corresponding to the plurality of cells comprises:
  receiving at least one message 2 (MSG2) from a base station of a first cell, wherein the at least one MSG2 comprises a first TA corresponding to the first cell and a second TA corresponding to a second cell.

* * * * *